(12) United States Patent
White et al.

(10) Patent No.: US 8,464,535 B2
(45) Date of Patent: Jun. 18, 2013

(54) SYSTEMS, APPARATUS AND METHODS FOR THERMAL ENERGY STORAGE, COUPLING AND TRANSFER

(75) Inventors: Maurice White, Pasco, WA (US); Peter Brehm, Richland, WA (US)

(73) Assignee: Infinia Corporation, Ogden, UT (US)

( * ) Notice: Subject to any disclaimer, the term of this patent is extended or adjusted under 35 U.S.C. 154(b) by 0 days.

(21) Appl. No.: 12/904,073

(22) Filed: Oct. 13, 2010

(65) Prior Publication Data

US 2011/0083436 A1 Apr. 14, 2011

Related U.S. Application Data

(60) Provisional application No. 61/251,648, filed on Oct. 14, 2009.

(51) Int. Cl.
*F01K 1/00* (2006.01)
*F28D 17/00* (2006.01)
*F28D 19/00* (2006.01)
*F28D 15/00* (2006.01)

(52) U.S. Cl.
USPC ............................ 60/659; 165/10; 165/104.17

(58) Field of Classification Search
USPC ................ 60/516–526, 641.1, 641.8, 641.15, 60/645–683; 165/104.13–104.21, 10
See application file for complete search history.

(56) References Cited

U.S. PATENT DOCUMENTS

| | | | | |
|---|---|---|---|---|
| 2,095,088 A * | 10/1937 | Sioros | ................................ | 40/538 |
| 3,287,901 A * | 11/1966 | Tauer | ................................ | 60/671 |
| 3,662,835 A * | 5/1972 | Livingston | ...................... | 169/43 |
| 3,933,198 A * | 1/1976 | Hara et al. | ..................... | 165/272 |
| 3,951,128 A | 4/1976 | Schoenfelder | | |
| 4,146,057 A * | 3/1979 | Friedman et al. | ................ | 60/648 |
| 4,227,567 A * | 10/1980 | Greene | ..................... | 165/104.17 |
| 4,291,755 A | 9/1981 | Minto | | |
| 4,335,578 A * | 6/1982 | Osborn et al. | ................ | 60/641.8 |
| 4,466,478 A * | 8/1984 | Carlsson et al. | ......... | 165/104.17 |
| 4,696,338 A * | 9/1987 | Jensen et al. | ............. | 165/104.17 |
| 4,809,771 A | 3/1989 | Kennel et al. | | |
| 4,993,481 A | 2/1991 | Kamimoto et al. | | |
| 5,113,659 A | 5/1992 | Baker et al. | | |
| 5,323,843 A | 6/1994 | Olszewski et al. | | |
| 5,899,071 A * | 5/1999 | Stone et al. | .................. | 60/641.8 |
| 2010/0212656 A1 | 8/2010 | Qiu et al. | | |

OTHER PUBLICATIONS

Adinberg et al., "High Temperature Thermal Energy Storage an Experimental Study," J. Phys. IV France, 9:PR3-89-PR3-94, 1999.
Chow et al., "Thermal Conductivity Enhancement for Phase Change Storage Media," AIAA 89-1743, AIAA $24^{th}$ Thermophysics Conference, Buffalo, New York, Jun. 12-14, 1989.
Stine et al., "A compendium of Solar Dish/Stirling Technology," a report prepared by Sandia Natl. Laboratories, Albuquerque, NM and Livermore, CA for the U.S. Department of Energy, Printed Jan. 1994, 124 pgs.

* cited by examiner

*Primary Examiner* — Kenneth Bomberg
*Assistant Examiner* — Christopher Jetton
(74) *Attorney, Agent, or Firm* — K&L Gates LLP

(57) ABSTRACT

Systems, methods, and apparatus relating to the use of phase change material to store, transfer and convert heat, such as from solar radiation, to mechanical work or electricity. Apparatus, systems, components, and methods relating to thermal energy transfer and energy conversion are described herein. In one aspect, the invention relates to a containment vessel having a heat receiving region and a heat transfer region such that a plurality of phase change materials are disposed therein and a sequence of solid, liquid and vapor phases are used to transfer heat from a source to a heat receiver of a power conversion unit.

30 Claims, 20 Drawing Sheets

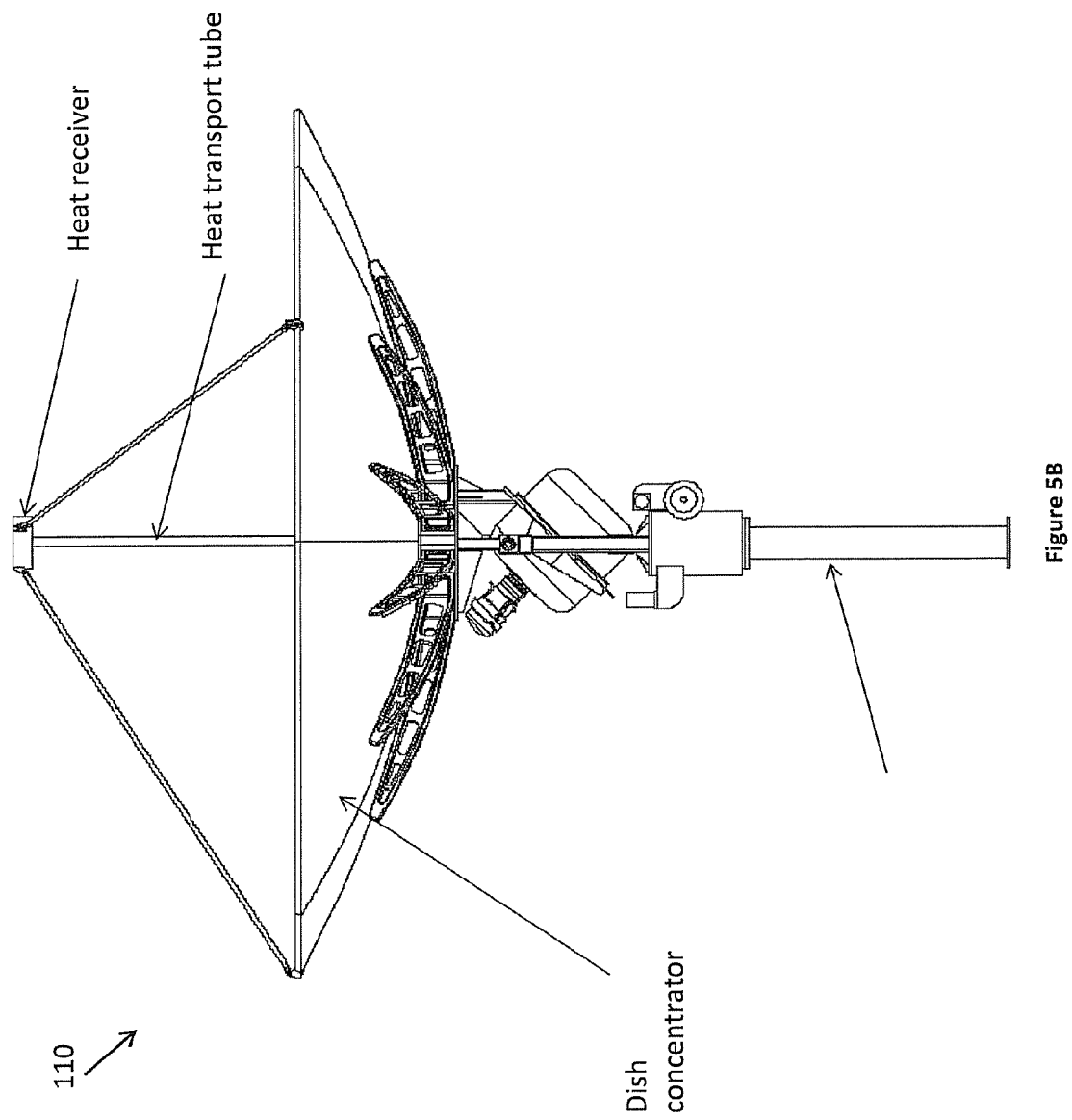

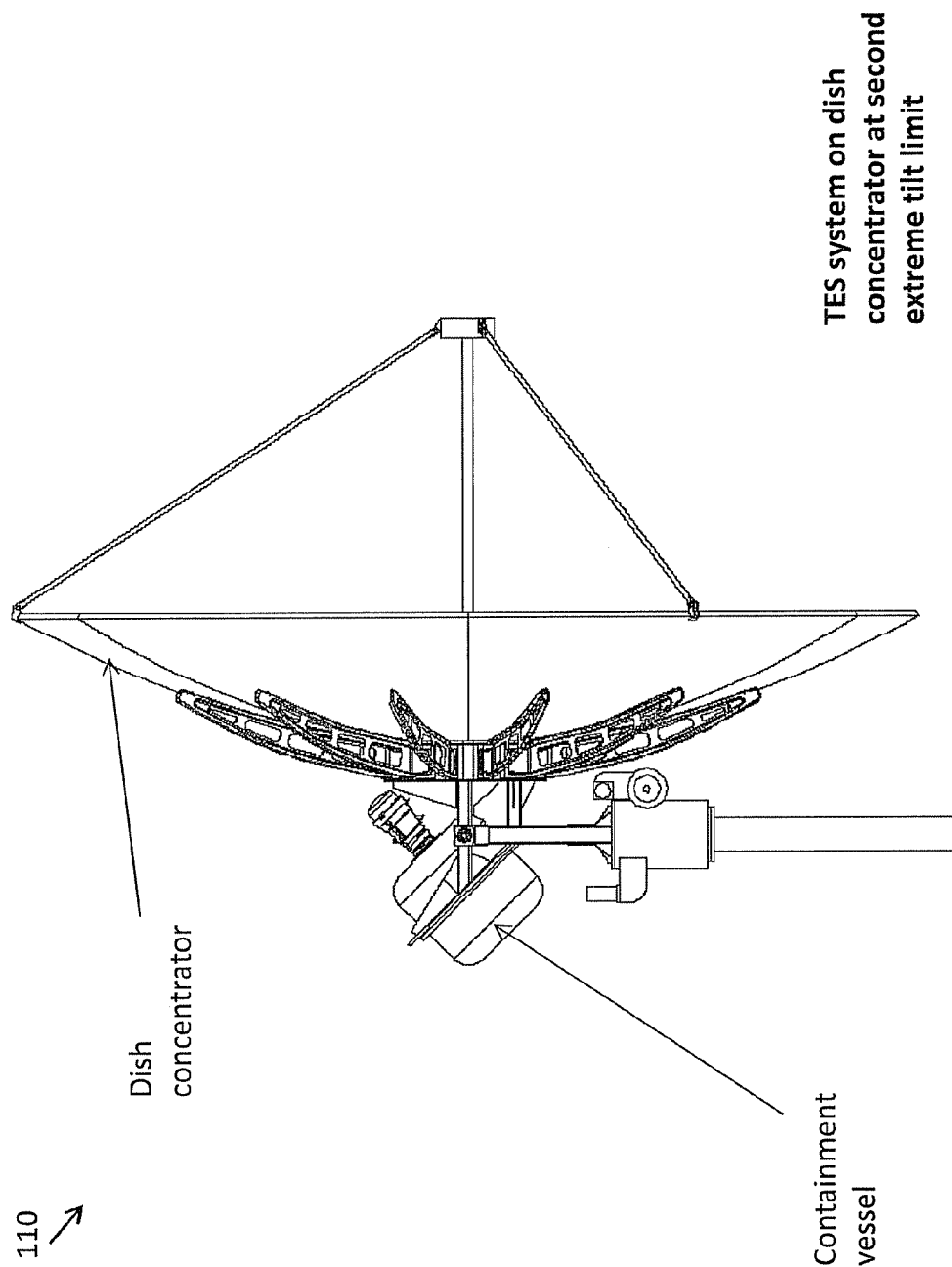

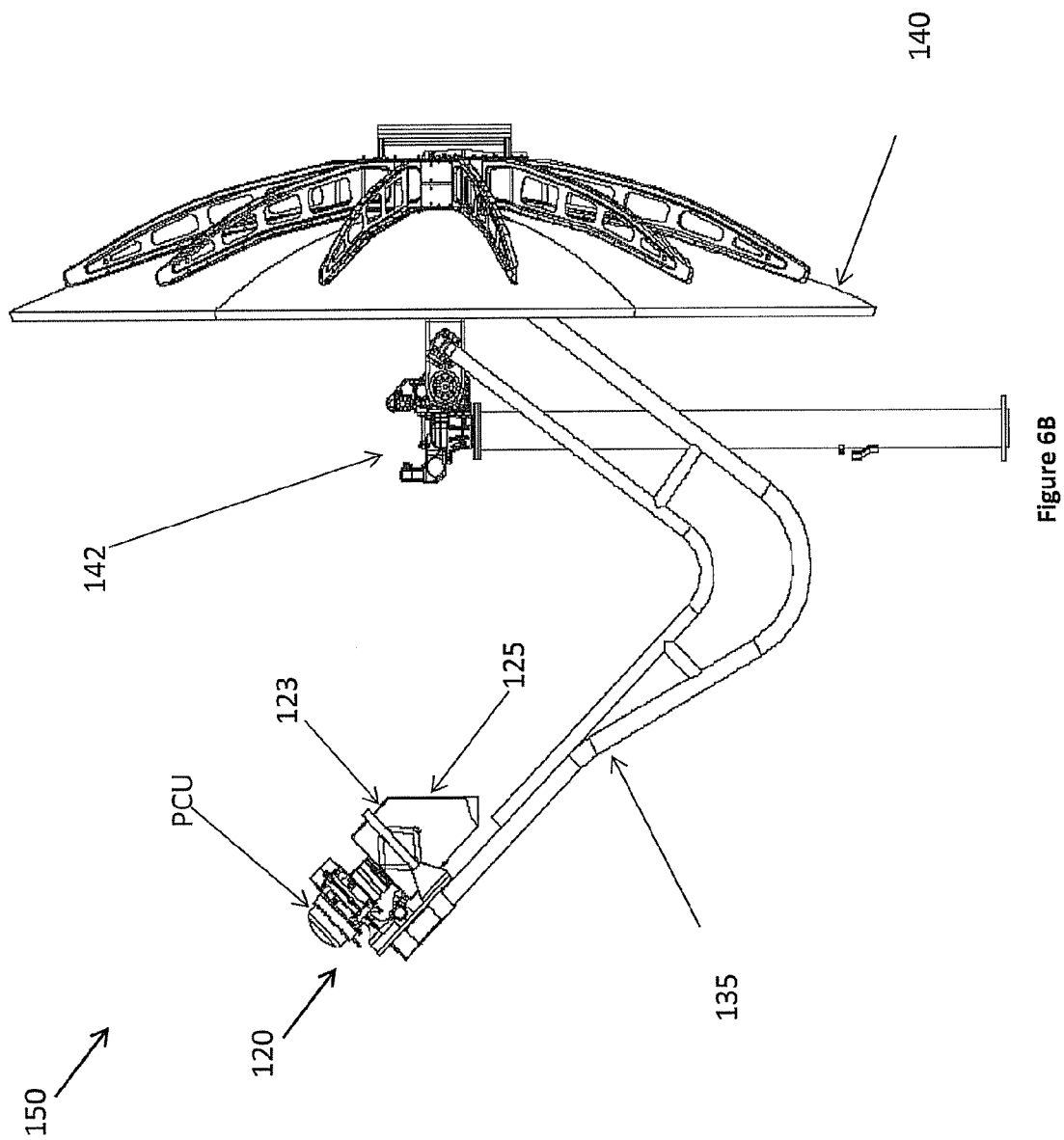

SYSTEMS, APPARATUS AND METHODS FOR THERMAL ENERGY STORAGE, COUPLING AND TRANSFER

CROSS REFERENCE TO RELATED APPLICATIONS

This application claims priority to and the benefit of U.S. Provisional Application No. 61/251,648, filed Oct. 14, 2009, the entire disclosure of which is hereby incorporated by reference herein for all purposes.

FIELD OF THE INVENTION

The invention relates generally to the field of energy converting devices, energy storage devices and energy transfer devices. More specifically, the invention relates to devices, systems, subsystems, components and methods that facilitate the collection, storage and transfer of heat and other types of energy.

BACKGROUND OF THE INVENTION

Current photovoltaic-based systems are expensive to produce and take from one to twenty years to recoup the amount of power required for their own production. Energy storage for photovoltaic systems must be done as electrical energy storage, which is far more costly and environmentally problematic than thermal energy storage. Various other solar thermal energy converting apparatuses are gaining support as an improvement for application to solar energy conversion. One challenge associated with all solar thermal energy-based systems is the storage and efficient transfer of thermal energy. Thermal energy storage (TES) units are an area of active research to solve this problem. Unfortunately, they are typically inefficient due to various heat transfer limitations and interfaces and often use liquid phase storage rather than phase change storage. Accordingly, a need exists for improved thermal energy storage and transfer methods, apparatus and systems.

SUMMARY OF THE INVENTION

In one embodiment, the invention relates to a system for using concentrating solar power and other heat sources in conjunction with thermal energy transfer and devices in a unique integration of innovative components or subsystems that improve performance and reduce cost. Some embodiments include a phase change material-based system applicable to solar thermal dish concentrator, trough and power tower systems, Stirling systems, and other energy conversion systems, allowing for high temperature (400-1000 C) maintenance-free thermal energy storage and heat coupling and transfer between subsystems. Such embodiments allow large amounts of energy to be transferred using a combination of liquid, solid and vapor phases and to store energy using phase change materials. In one embodiment, the systems, methods, and devices described herein are used in lieu of heat pipes. As a result, the cost and complexity of heat pipes to add heat energy to a thermal storage medium can be avoided, and heat pipes to transfer heat from the storage medium to the energy converter are likewise avoided.

The present invention relates to thermal energy storage and coupling methods, systems and devices that are suitable for use with various heat sources and power conversion units (PCUs) or energy converting apparatuses (ECAs). In one embodiment, a thermal energy storage and transfer unit includes a cavity or vessel that includes first and a second phase change material such the first phase change material is a solid at room temperature while the second phase change material is a solid or a liquid at room temperature. In another embodiment, the thermal energy storage device is designed such that heat pipes are not disposed within the cavity or vessel. In one embodiment, the PCU is coupled to the outer surface of the containment vessel or otherwise in thermal communication with either the first or second phase change materials.

In one embodiment, the invention relates to a mechanical assembly that includes a solar energy collector, typically a reflective surface or an array of mirrors, an ECA and a thermal energy storage apparatus that includes a first and a second phase change material. In one embodiment, the ECA includes a Stirling cycle engine. A free-piston Stirling engine embodiment can be configured such that both the collector and the ECA are elevated relative to the ground on a pier to enable better solar energy collection and engine positioning. The thermal energy storage or transfer device may be incorporated within the elevated ECA or be located remotely therefrom such as on or under the ground. Various TES embodiments of the invention include a liquid metal or other pool boiler heat transport system that is integral with the TES phase change material and thermal conductivity enhancement within the phase change material.

In one embodiment, the invention relates to a thermal energy transfer system. The thermal energy transfers system can include: a containment vessel defining a cavity having an inner surface an outer surface; a first phase change material having a first liquid density disposed in the cavity; a second phase change material having a second liquid density, the second phase change material disposed in the cavity and adjacent to and in contact with the first phase change material, wherein the second liquid density is less than the first liquid density; a vapor space adjacent to and defined by the inner surface and the second phase change material; and a heat receiver of a power conversion unit, the heat receiver disposed in the vapor space. In one embodiment, the heat receiver is oriented within the containment vessel such that a vapor phase of the second phase change material condenses thereon. In one embodiment, the energy transfer system can include a heat source interface in thermal communication with the first phase change material. In one embodiment, the heat source interface or heat source is selected from the group consisting of a subsurface of the outer surface of the containment vessel, a combustion engine exhaust, an industrial process or other waste heat stream, a manifold, a pipe, a plate, a finned structure, a dish concentrator, a trough concentrator, a heliostat, a reflector, a thermal energy storage unit, and a reactor. In one embodiment, the first phase change material comprises a first material selected from the group consisting of a eutectic composition material; a substantially pure composition material, NaF/NaCl, $MgCl_2$, $NaF/CaF_2/MgF_2$, $KF/NaF/MgF_2$, KF/NaF, $KF/BeF_2$, $BeF_2$, $NaF/MgF_2$, $LiF/MgF_2$, $Li_2CO_3$, LiH, $LiF/NaF/MgF_2$, LiF, $NaCl/NiCl_2$, LiOH/LiF, LiOH, LiF/LiCl, NaCl, KCl/NaCl, $Na_2B_4O_7$. $NaF/MgF_2/Kf$, NaF, $BeF_2$, LiCl/KCl, and the second phase change material comprises a material selected from the group consisting of a eutectic material, a substantially pure composition material, Na, K, NaK, Li, Rb, Cs, S, Hg, Mg. In one embodiment, when the containment vessel is heated, the first phase change material changes phase from a solid to a liquid and the second phase change material changes phase from a liquid to a vapor.

In one embodiment, the energy transfer system can include a power conversion unit. In addition, the power conversion unit can be selected from the group consisting of a closed cycle heat engine, a Stirling engine, a Brayton cycle engine and a Rankine cycle engine. In one embodiment, the first phase change material has a liquid density that is less than its solid density. In one embodiment, the vapor space defines a vacuum or is filled with an inert gas.

In one embodiment, the invention provides an electric power generating system. The electric power generating system can include: a power conversion unit including a thermal energy conversion system and a heat receiver in thermal communication with the thermal energy conversion system; a containment vessel defining a cavity having an inner surface an outer surface; a first phase change material having a first liquid density disposed in the cavity; a second phase change material having a second liquid density, the second phase change material disposed in the cavity and adjacent to and in contact with the first phase change material, wherein the second liquid density is less than the first liquid density, and the second phase change material in thermal communication with the heat receiver; a vapor space adjacent to and defined by the inner surface and the second phase change material, wherein the heat receiver is disposed in the vapor space; and a heat source interface in thermal communication with the first phase change material. In one embodiment, the heat receiver is oriented within the containment vessel such that a vapor phase of the second phase change material condenses thereon. In one embodiment, the first phase change material has a liquid density that is less than its solid density. In one embodiment, the heat source or heat source interface is selected from the group consisting of a subsurface of the outer surface of the containment vessel, a combustion engine exhaust, an industrial process or other waste heat stream, a manifold, waste heat, a pipe, a plate, a finned structure, a dish concentrator, a trough concentrator, a heliostat, a reflector, a thermal energy storage unit, and a reactor. In one embodiment, the first phase change material comprises a eutectic composition material; a substantially pure composition material, NaF/NaCl, $MgCl_2$, $NaF/CaF_2/MgF_2$, $KF/NaF/MgF_2$, KF/NaF, $KF/BeF_2$, $BeF_2$, $NaF/MgF_2$, $LiF/MgF_2$, $Li_2CO_3$, LiH, $LiF/NaF/MgF_2$, LiF, $NaCl/NiCl_2$, LiOH/LiF, LiOH, LiF/LiCl, NaCl, KCl/NaCl, $Na_2B_4O_7$. $NaF/MgF_2/Kf$, NaF, $BeF_2$, LiCl/KCl, and the second phase change material comprises a material selected from the group consisting of a eutectic material, a substantially pure composition material, Na, K, NaK, Li, Rb, Cs, S, Hg, Mg. In one embodiment, the electric power generating system can include a solar concentrator positioned to direct solar energy upon the heat source interface, wherein the heat source interface is a portion of the outer surface of the containment vessel. In one embodiment, the heat source interface is a manifold having a first port and a second port, wherein the manifold displaces a volume of the first phase change material and the first and second ports are disposed in the outer surface of the containment vessel.

In one embodiment, the invention provides a method of transferring thermal energy between a heat source and a power conversion unit having a heat receiver. The method can include the steps of: transferring thermal energy from the heat source to a first phase change material disposed in a containment vessel; transferring thermal energy to a second phase change material in the containment vessel using the first phase change material; vaporizing the second phase change material; and condensing the second phase change material on a heat receiver disposed in the containment vessel above the first phase change material such that thermal energy is transferred to the heat receiver. In one embodiment, the temperature of the heat receiver is substantially uniform as a result of the heat transfer from the second phase change material. In one embodiment, the method can include the step of solidifying the first phase change material after transferring thermal energy to the first phase change material. In one embodiment, the first phase change material comprises a eutectic composition material; a substantially pure composition material, NaF/NaCl, $MgCl_2$, $NaF/CaF_2/MgF_2$, $KF/NaF/MgF_2$, KF/NaF, $KF/BeF_2$, $BeF_2$, $NaF/MgF_2$, $LiF/MgF_2$, $Li_2CO_3$, LiH, $LiF/NaF/MgF_2$, LiF, $NaCl/NiCl_2$, LiOH/LiF, LiOH, LiF/LiCl, NaCl, KCl/NaCl, $Na_2B_4O_7$. $NaF/MgF_2/Kf$, NaF, $BeF_2$, LiCl/KCl, and the second phase change material comprises a material selected from the group consisting of a eutectic material, a substantially pure composition material, Na, K, NaK, Li, Rb, Cs, S, Hg, Mg. In one embodiment, the method can include the step of storing thermal energy in the first phase change material sufficient for powering the power conversion unit.

In one embodiment, the invention provides a thermal energy storage system. The thermal energy storage system can include: a containment vessel defining a cavity comprising an inner surface an outer surface; a thermal energy storage medium; a vapor space adjacent to and defined by the inner surface and the second phase change material; and a heat receiver of a power conversion unit, the heat receiver disposed in the vapor space. The thermal energy storage medium can comprise a thermal energy storage material having a first liquid density disposed in the cavity; and a phase change material having a second liquid density, the phase change material disposed in the cavity and adjacent to and in contact with the thermal energy storage material, wherein the second liquid density is less than the first liquid density. In one embodiment, the energy storage medium stores sufficient thermal energy to power the power conversion unit from about 1 hour to about 24 hours. In one embodiment, the thermal energy storage material comprises a eutectic composition material; a substantially pure composition material, NaF/NaCl, $MgCl_2$, $NaF/CaF_2/MgF_2$, $KF/NaF/MgF_2$, KF/NaF, $KF/BeF_2$, $BeF_2$, $NaF/MgF_2$, $LiF/MgF_2$, $Li_2CO_3$, LiH, $LiF/NaF/MgF_2$, LiF, $NaCl/NiCl_2$, LiOH/LiF, LiOH, LiF/LiCl, NaCl, KCl/NaCl, $Na_2B_4O_7$. $NaF/MgF_2/Kf$, NaF, $BeF_2$, LiCl/KCl, and the phase change material comprises a material selected from the group consisting of a eutectic material, a substantially pure composition material, Na, K, NaK, Li, Rb, Cs, S, Hg, Mg. In one embodiment, the vapor space defines a vacuum or is filled with an inert gas. In one embodiment, the thermal energy storage material has a liquid density that is less than its solid density.

In one embodiment, the invention relates to a thermal energy transfer system that includes a containment vessel comprising an inner cavity. The cavity includes a heat receiver having a first portion and a second portion such that the first portion is disposed within the cavity and the second portion is outside the cavity. A thermal energy transfer material is disposed within the cavity. In one embodiment, the thermal energy transfer material comprises a first phase change material and a second phase change material. In one embodiment, the thermal energy transfer material consists essentially of a first phase change material and a second phase change material. In one embodiment, the thermal energy transfer material consists of a first phase change material and a second phase change material.

The TES embodiments described herein offer advantages relative to existing heat pipe networks to move heat into and out of the TES device. For example, in one embodiment, using sodium, in-situ, as a heat transport media, greatly reduces the cost of the TES system allows for much larger storage devices and enables capacity factors necessary for large scale or continuous solar power generation. While optimal TES salts can contain costly lithium, alternatives such as NaCl (common table salt) and NaF (used in toothpaste) are low in cost, environmentally friendly and provide good thermal storage properties.

In one embodiment, a thermal storage or transfer medium is selected that includes a material such as a phase change material (PCM) with a melting temperature close to the ideal operating temperature of the selected energy conversion device. In one embodiment, a thermal storage or transfer medium with a relatively high latent heat of fusion is selected. In one embodiment, the phase change thermal storage or transfer medium has a solid density greater than its liquid density.

In one embodiment, as long as any of the first PCM is liquid, that liquid phase of the PCM will fill void cracks in the mostly solid region of the first PCM, but it will also gravitate to the top of the first PCM to form a liquid surface above the solid portion that is at or above (during heating conditions when all the first PCM is molten) the melting point of the first PCM.

In one embodiment, the heat transport fluid, a second PCM, floats on top of another first PCM storage medium and therefore is free to absorb heat from the first PCM to evaporate the heat transport fluid (second PCM) and deliver heat energy to the energy conversion device by condensing on the PCUs heat acceptor or receiver. In one embodiment, temperature at the heat acceptor or receiver will remain close to the melt/freeze temperature of the first PCM until all of the first phase change material solidifies, then the temperature will decrease as the first change material is cooled below its freezing/solidification temperature.

In one embodiment, the elevated power generation embodiments described herein that tilt or rotate relative to an axis can tilt or rotate a containment vessel from 0 degrees to about 45 degrees in one embodiment. In some embodiments, tilting a containment vessel beyond 45 degrees can result in a heat receiver failing to stay within a vapor space such that it can receive heat from a vapor phase of a phase change material.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views. The drawings associated with the disclosure are addressed on an individual basis within the disclosure as they are introduced.

FIGS. 5A to 5C are schematic diagrams depicting an electricity generation system that includes an elevated solar concentrator, a thermal energy transfer device and a PCU in a full range of operational positions, in accordance with an illustrative embodiment of the invention.

FIGS. 6A and 6B are schematic diagrams depicting a hybrid electricity generation system that includes an elevated solar concentrator, a thermal energy transfer device and a PCU unit, in accordance with an illustrative embodiment of the invention.

DETAILED DESCRIPTION

Figure 1:
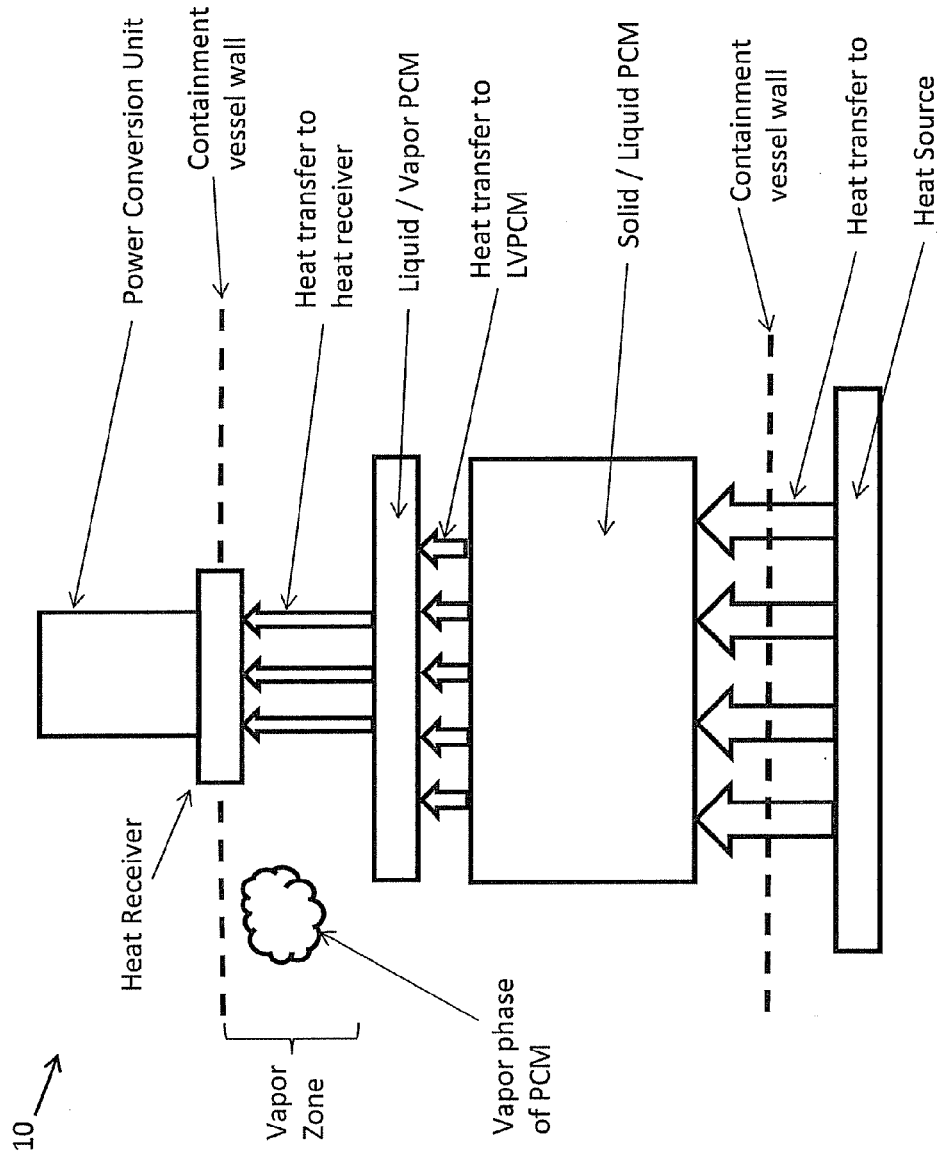
FIG. 1 is schematic diagram illustrating operating principles of a system for coupling heat from a heat source to a power conversion unit using two phase change materials that include a vapor or gas phase, in accordance with an illustrative embodiment of the invention.

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention, rather the scope of the present invention is defined by the claims.

The use of sections or headings in the application is not meant to limit the invention; each section and heading can apply to any aspect, embodiment, or feature of the invention.

It should be understood that the order of the steps of the methods of the invention is immaterial so long as the invention remains operable. Moreover, two or more steps may be conducted simultaneously or in a different order than recited herein unless otherwise specified.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

It should be understood that the terms "a," "an," and "the" mean "one or more," unless expressly specified otherwise.

The foregoing, and other features and advantages of the invention, as well as the invention itself, will be more fully understood from the description, drawings, and claims.

There is today an increasingly urgent need for improvements in environmentally sound (or renewable) energy conversion and energy storage. An important class of renewable PCUs is closed cycle heat engines such as Stirling engines or closed cycle Brayton or Rankine PCUs. There are many renewable sources of thermal energy that are often diffuse in nature which make them difficult to efficiently interface with PCUs, and which typically have severe constraints on the geometry, surface area and heat exchanger characteristics of their heat receivers.

Examples of such diffuse heat sources include geothermal, solar, internal combustion engine exhaust streams and industrial process waste heat (the heat from such sources is valuable because it can be converted to more useful electrical or mechanical energy rather than simply lost as heat to the environment). While such heat sources are capable of generating useful electrical or mechanical energy when coupled with a PCU, the cost, complexity and efficiency of doing so are often problematic or prohibitive. Similarly, there is also often a need for energy storage where the energy source is intermittent or unreliable, as is the case with solar energy. Storage mechanisms such as batteries or capacitors for electrical energy or molten salt for thermal energy are costly or complicated. The present invention addresses these needs in a simple, cost-effective manner.

This application relates to thermal energy transfer (TET) and thermal energy storage (TES) systems, devices, subsystems, and methods that incorporate phase change materials that are suitable for use with a various ECAs or PCUs. Since the embodiments described herein can be used to couple or transfer heat between a heat source and a PCU and/or simultaneously store thermal energy, the terms TET and TES are used interchangeably herein. In addition, the terms energy converting apparatus (ECA) and power conversion unit (PCU) are also used interchangeably herein. ECAs or PCUs refer to any suitable device, apparatus, or system that receives or transfers heat energy and converts it to other more useful forms of energy, work or power.

One preferred example of an ECA is a Stirling engine-based apparatus that includes a heater head suitable for interfacing with a vapor in the heat delivery portion of a TET device wherein the received heat drives a piston to produce electricity. Examples of PCUs and ECAs include Stirling, Brayton, and Rankine cycle-based devices, solar power towers, solar concentrators, fuel burning engines or reactors, solar energy concentrating systems, geothermal systems, hybrid systems having two forms of heat input such as solar energy and fossil fuel energy such that the most convenient or useful heat source is selected at any given time.

The invention also relates to apparatus and methods for coupling a heat source and a heat powered ECA using a vapor or a gas as the heat exchange rather than a mechanical system, or a porous or solid heat exchange device. In this context, and in one embodiment, mixing two phase change materials such that one material transfers heat in a vapor phase while the other material transfers heat in a liquid phase in response to input thermal energy from a heat source allows for heat transfer in some of the TET embodiments described below. In one embodiment, a vapor is used to deliver heat to a heat receiver of a PCU. In this embodiment, heat delivery to the PCU is substantially uniform in temperature during the entire heat extraction process, leading to significantly higher time averaged efficiency. An overview of these principles follows from a review of FIG. 1.

FIG. 1 is schematic diagram illustrating a system 10 for coupling thermal energy from a heat source to a power conversion unit. In one embodiment, the invention relates to a phase change system for thermal energy storage and/or hybrid heating of an externally heated power conversion system. At the bottom, a heat source such as the sun, geothermal heat, heat from a mechanical engine, waste heat, or other suitable heat sources is shown. The heat from this heat source is converted and transferred to the heat receiver of a PCU shown at the top of the figure. As shown, the heat receiver is disposed in a vapor zone within a containment vessel such that the heat from the source at the bottom is transferred to the receiver from a vapor or gas that contacts and/or condenses on the heat receiver. The heat receiver can be any suitable protuberances, fin, heater head, plate, metal member, or other apparatus to receive heat and convey it to the PCU. In between the heat receiver and the heat source are two or more phase change materials disposed in the containment vessel in various phases depending on temperature levels in the materials and whether heat is being actively applied from the source.

The system 10 includes two phase change materials in intimate contact with one another. One of the materials is a solid-liquid phase change material and the other is a liquid-vapor phase change material. In one embodiment, the solid-liquid material has the property that its solid phase is denser than the liquid phase. The other material disposed in the containment vessel is a liquid-vapor material (which may optionally be solid during cold conditions) that floats on the solid-liquid material and absorbs heat from the solid-liquid material. This heat absorption causes it to vaporize and then condense on the heat receiver or heat absorber of the PCU (located in the vapor zone) to deliver the heat necessary to operate the PCU. The vapor zone is within a volume defined by a portion of the containment vessel in which the heat receiver is disposed. In one embodiment, the liquid-vapor material has a lower liquid density than the liquid density of the solid-liquid material. The containment vessel can be sealed to maintain a partial vacuum or contain a low pressure gas that is inert with respect to the phase change materials.

Figure 7A:
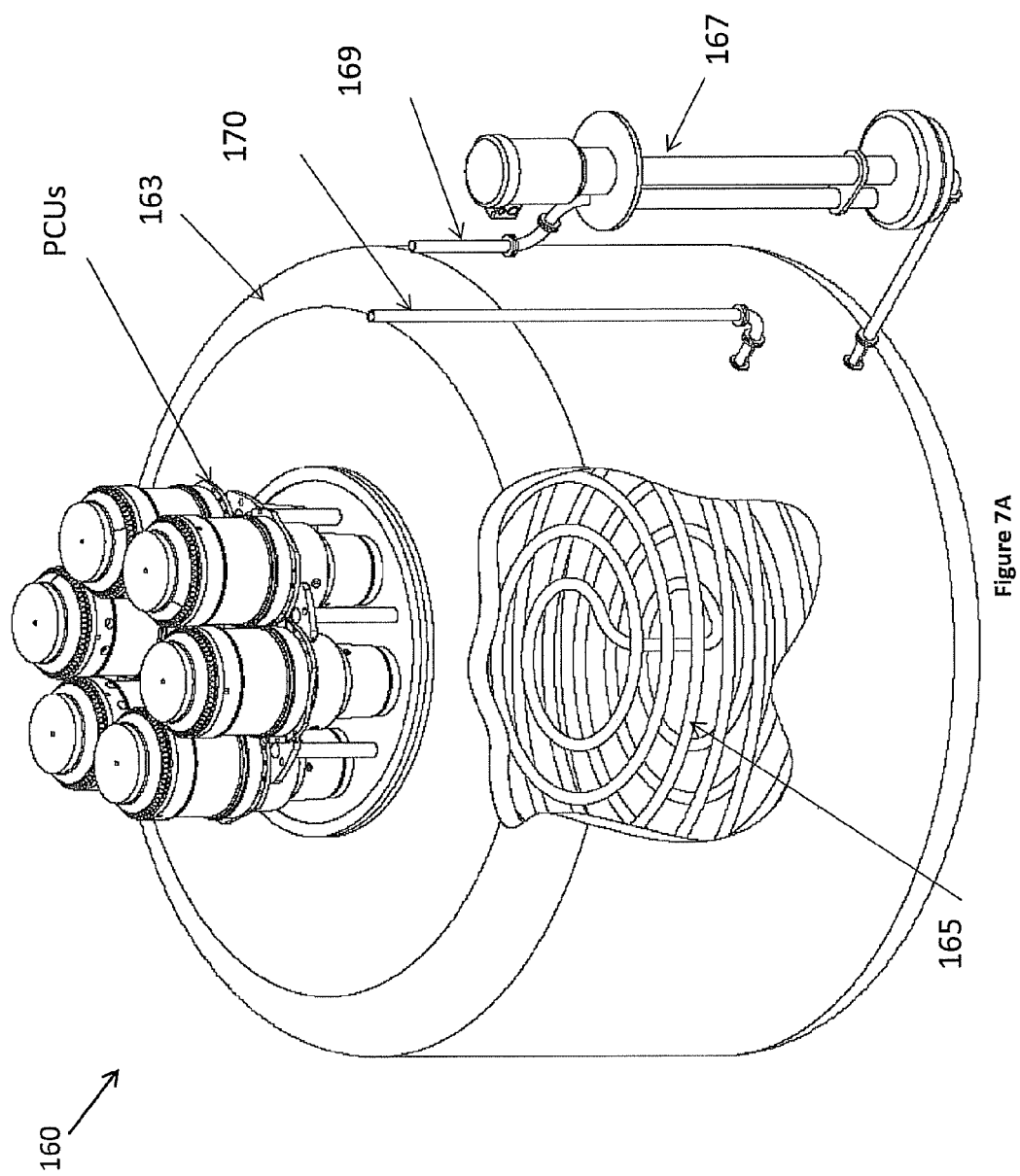
FIGS. 7A and 7B are schematic diagrams illustrating a plurality of PCUs thermally coupled to a containment vessel for electricity generation and components for the same, in accordance with an illustrative embodiment of the invention.

FIG. 1 shows a method for transferring heat from a single or multiple heat sources to a PCU, with or without intermediate thermal energy storage that offers the many advantages as outlined herein. The first step is that energy flows from the generic heat source to a liquid/solid phase change material (LSPCM) across the containment vessel wall. This may take the form either of direct transfer such as the concentrated solar embodiment described below or other embodiment such as shown in FIG. 7A in which a piping system conveys a heat source fluid through penetrations of the vessel wall and serves as an embedded heat exchanger in the LSPCM. The gradual change of the LSPCM from solid to liquid is the next step in one embodiment. Thus, the first phase change material, LSPCM, melts to a liquid by absorbing heat equivalent to its heat of fusion. Later in the method, this liquid re-solidifies (and sinks back to the bottom of the liquid LSPCM since the solid is more dense) in the process of transferring its heat to the liquid/vapor phase change material (LVPCM). This heat transfer step causes the second phase change material, LVPCM, to evaporate by absorbing the heat transferred from the liquid phase of the first PCM to become the latent heat of vaporization of the second PCM.

With respect to FIG. 1, the next heat transfer process occurs when the vapor portion of the LVPCM condenses on the heat receiver, thus transferring its heat of vaporization to the heat receiver, and then returns as liquid droplets to the liquid region of the LVPCM by the force of gravity. The net result of this is an effective means for transferring thermal energy from the heat source heat to the heat receiver in an efficient manner while accommodating the typically disparate requirements of the heat source and heat receiver. In one embodiment, these steps are performed with respect to a hermetically sealed containment vessel that is easy to maintain and has a long operating life. In addition, using the two PCMs and features recited herein also includes thermal energy storage features with virtually unlimited capacity scalability, and all in a compact space.

Figure 2A:
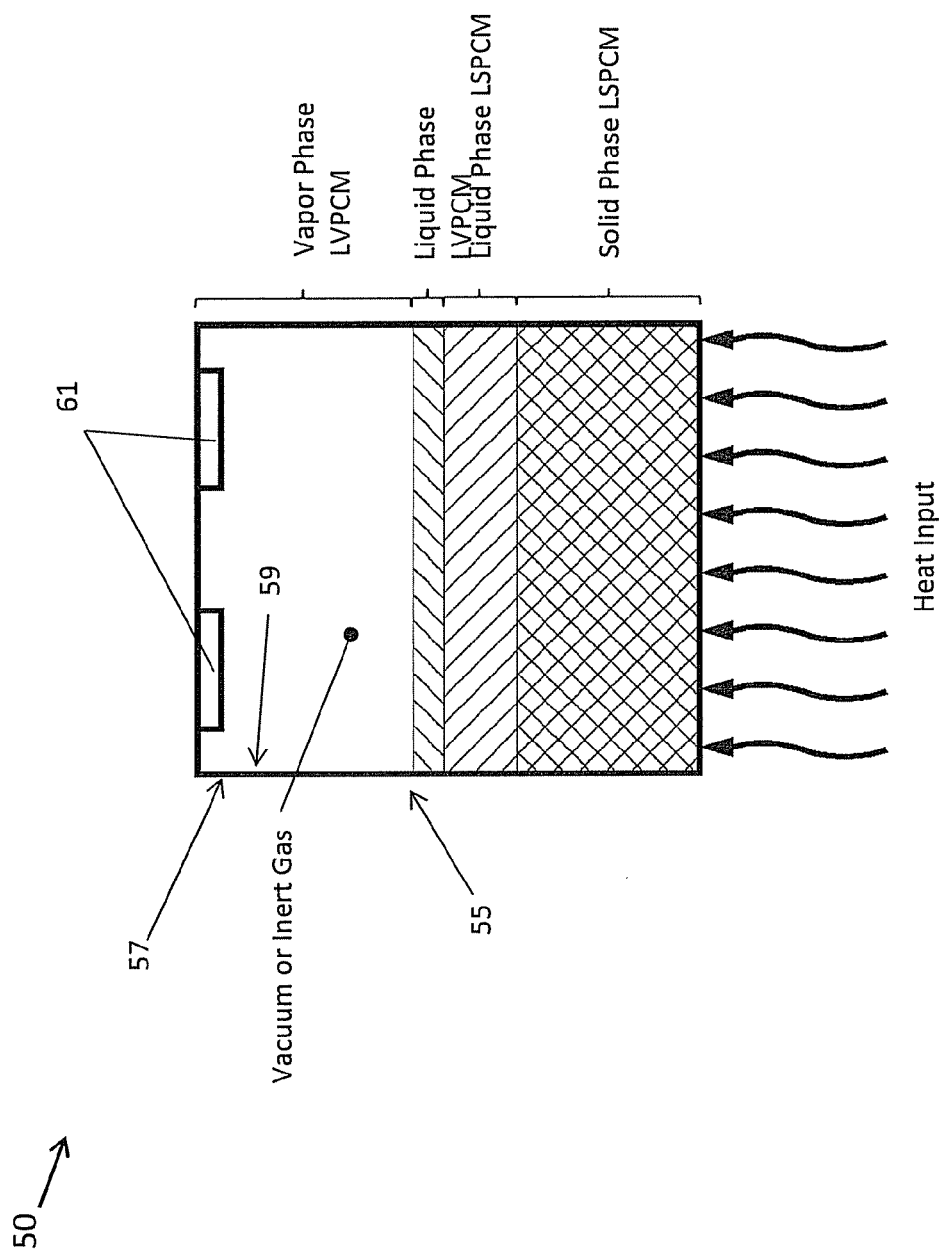
FIGS. 2A-2E are schematic diagrams illustrating a phase change material-based system for converting, storing and transferring thermal energy, in accordance with an illustrative embodiment of the invention.

Various features of an exemplary thermal energy storage device or 50 are shown in FIG. 2A. The TES device 50 includes a cavity or vessel 55. The vessel or cavity is typically a sealed pressure or containment vessel. The vessel has an exterior surface 57 and an interior surface 59 and is suitable for incorporation in and connection to any suitable PCU.

Thus, the device 50 is sized and shaped such that an exterior surface of the device can receive thermal energy or heat. Alternatively, heat transfer elements from a heat source and heat receiving elements 61 from a PCU can be disposed in the vessel 55. In a preferred embodiment, the vessel is a sealed containment vessel that defines a closed interior volume that includes a vacuum or low pressure inert gas and further contains various phase change materials.

Specifically, in one embodiment, the interior surface 59 of the device 50 defines a cavity or volume that includes a first phase change material and a second PCM. The first PCM includes a LSPCM in which the liquid density is less than the solid density. In one embodiment, the LSPCM is a solid prior to the application of the input thermal energy such that, at a certain operating temperature range of the system, the LSPCM gradually undergoes a phase change to a liquid and some portion of the LSPCM remains a liquid during portions of the operating cycle of the device 50 in which the PCU connected to the heat receivers 61 is producing power or doing work. In one embodiment, the second PCM includes a LVPCM in which the liquid density is less than the liquid density of the LSPCM. In one embodiment, the second PCM may also be in solid form under certain non-operational conditions.

In one embodiment, the LVPCM is either a liquid or a solid prior to the application of the input thermal energy (shown at bottom of FIG. 2A) such that within a certain operating temperature range of the system the LVPCM undergoes a phase change to a vapor or gas and a portion of the LVPCM is a vapor or gas during portions of the device 50 or PCUs operating cycle. Notwithstanding the forgoing, as part of the heat transfer performed by the LVPCM, it condenses back to a liquid or a solid during different stages of the operation of the TES device. One or more regions, portions or one or more surfaces of the device can interface with a PCU that receives heat and converts it to useful work. In one embodiment, one or more heat receivers 61 are located relative to a volume of the vessel such as in the vapor space above the PCM. Suitable heat receivers 61 include for example a Stirling engine heater head or a steam generator. In addition, a heat source with a mechanism for transferring heat into the vessel using a heat transfer interface and ultimately to the first and second phase change materials can be disposed adjacent to the TES device 50. As discussed in more detail below the interior surface of the vessel can be tapered or textured such that movement of the PCMs is enhanced and stresses are reduced. NaCl/NaF is a PCM eutectic with 43% NaCl and 57% NaF by weight that melts at 675° C. and is used in one embodiment as the first of the two PCMs. This exemplary LSPCM has a heat of fusion of about 195 w-hr/kg, which together cost about $0.50/kg, results in an advantageous heat-of-fusion-only storage at about $2.50/kWh. An even more cost effective option is pure NaCl, which melts at 800 C, requiring appropriate containment and heat receiver material, but costs about $0.70/kWh.

As shown in FIG. 2A, this arrangement of a first and second PCM in a sealed volume decouples the heat source's heat supply characteristics from the heat receiver's heat exchange requirements. The device 50 also has the capability for substantial thermal energy storage near an optimal fixed temperature (for an LSPCM selected for a melting point near the desired temperature) rather than over a range of temperatures. The decoupling of the heat receiver and heat source occurs because the supply heat is delivered to the LSPCM through or across the containment vessel in a manner that can be adapted to the characteristics of the heat source and the LSPCM. The heat is delivered to the PCU through the heat receiver by condensation from the vapor phase of the LVPCM on the heat receiver. This is an advantageous heat transfer process from the PCU heat receiver standpoint because using a heated vapor as the heat transfer source provides high heat flux at essentially the constant melting temperature of the LSPCM. In addition, this use of the vapor within the TES device is independent of the PCU heat receiver 61 geometry. This is a significant improvement over heat transfer to a heat receiver in which there can be a significant and deleterious temperature variation across the heat receiver interface. Various embodiments and elements shown in the figures are in thermal communication. As used herein thermal communication means that two or more objects or materials are positioned or coupled such that heat can be readily transferred therebetween based on their respective properties, positions or by means of a heat transfer medium or device.

To understand these different heat transfer stages and functions, it is informative to describe them starting with the entire system at ambient temperature conditions. Initially, heat input from the heat source is delivered to the LSPCM, resulting initially in local LSPCM melting adjacent to the heat source interface. Since the resulting liquid is less dense than the solid, it migrates to the top of the LSPCM where it contacts the LVPCM. Heat transfer from the liquid LSPCM to the liquid LVPCM causes some of the LVPCM to vaporize. This vapor will condense on the coolest portion of the vapor region.

Typically, this coolest portion is the heat receiver 61 since the receiver 61 will be extracting heat to operate the PCU while the rest of the typically insulated containment vessel with an inner vapor chamber will be at substantially isothermal conditions with minimal heat extraction. In one embodiment, a typical thermal storage or heat transfer operational sequence, the heat source would continue delivering heat at a higher rate than the PCU extraction heat rate until the LSPCM is substantially all melted.

At that point, the heat supply would be stopped and the PCU would continue to operate at substantially the same temperature until substantially all the LSPCM was solidified. This mechanism, in which the PCU operates at substantially the same temperature at any time the LSPCM has a liquid fraction, is a desirable operating condition. These and other features described herein provide a great deal of versatility and control with respect to the heating cycle and how much thermal storage is available. The heat source heat transfer mechanism can take a variety of forms. For example, concentrated solar energy or directed combustion energy may be applied directly to the exterior of the containment vessel in a region where LSPCM is in contact with the adjacent interior wall of the containment vessel. Alternatively, heat exchangers/heat transfer interfaces connected to a heat source are disposed within the vessel in various embodiments.

Figure 2B:
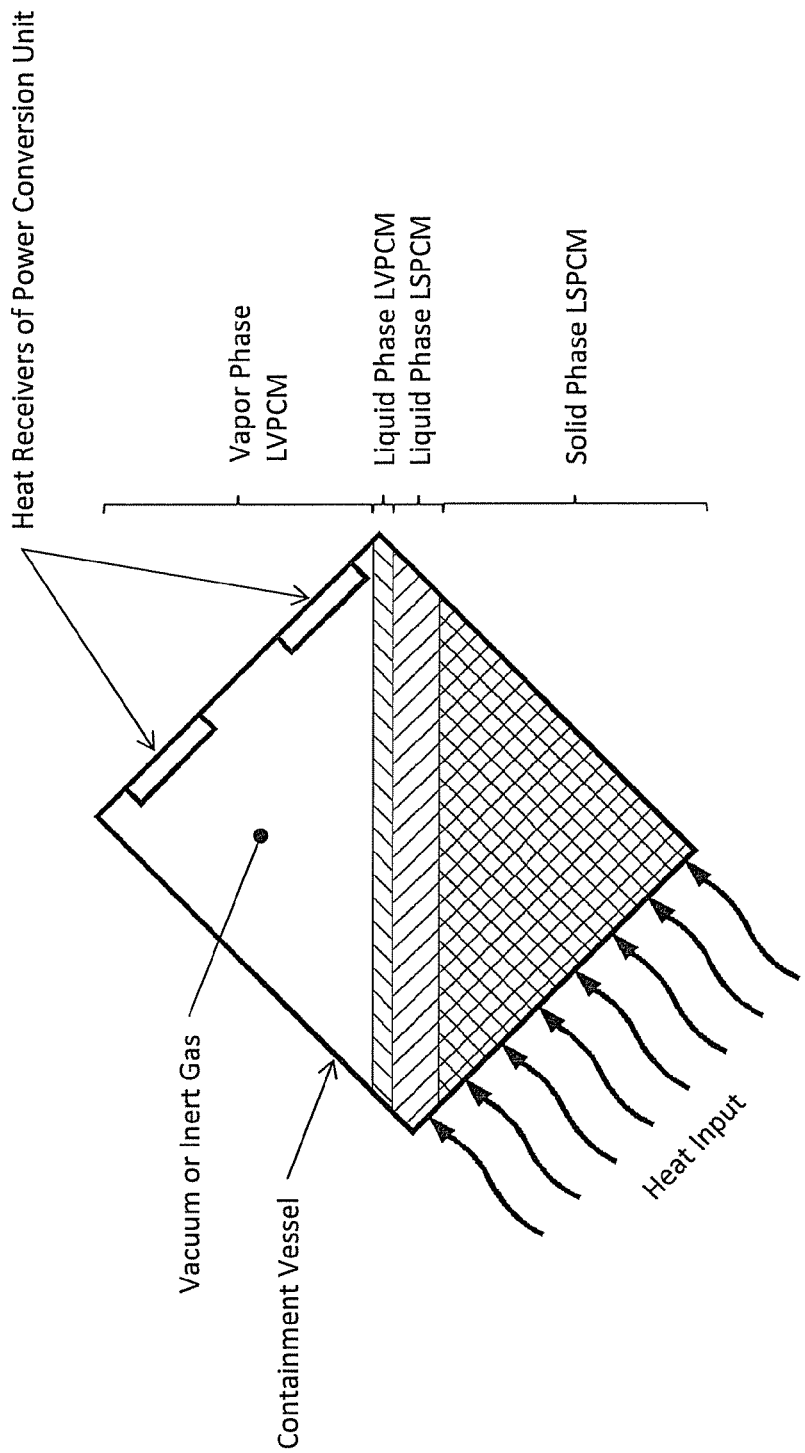

In FIG. 2A, the force of gravity is assumed to be in the conventional direction from top to bottom. FIG. 2B illustrates a functional limit for tipping the entire TET assembly from the vertical. Thus, FIG. 2B shows the device 50 of FIG. 1A undergoing a tilt or rotation. In various preferred embodiments, the TET systems described herein may be mounted to a boom and rotated through various angles when the heat source is sunlight reflected from a concentrating dish. As a result, evaluating the effect of tilt of the TES is useful to understand the operation and requirements of such embodiments.

In addition, in various embodiments, any orientation in which the PCU heat receivers remain substantially within the vapor space above the liquid phase of the LVPCM is acceptable. In addition to the relative liquid and solid densities, the appropriate LSPCM properties for a given application are selected to have a melting point in the desired range for PCU heat receiver operation and to have a high latent heat of fusion when thermal energy storage is an objective rather than using the TET primarily for vapor coupling and heat transfer. In one embodiment, in addition to having the liquid density for the LVPCM being less than the LSPCM liquid density, at least one PCM is selected to provide a vapor pressure and latent heat of vaporization consistent with the PCU heat transfer requirements, as well as operational compatibility properties suitable for all system elements.

Figure 2C:
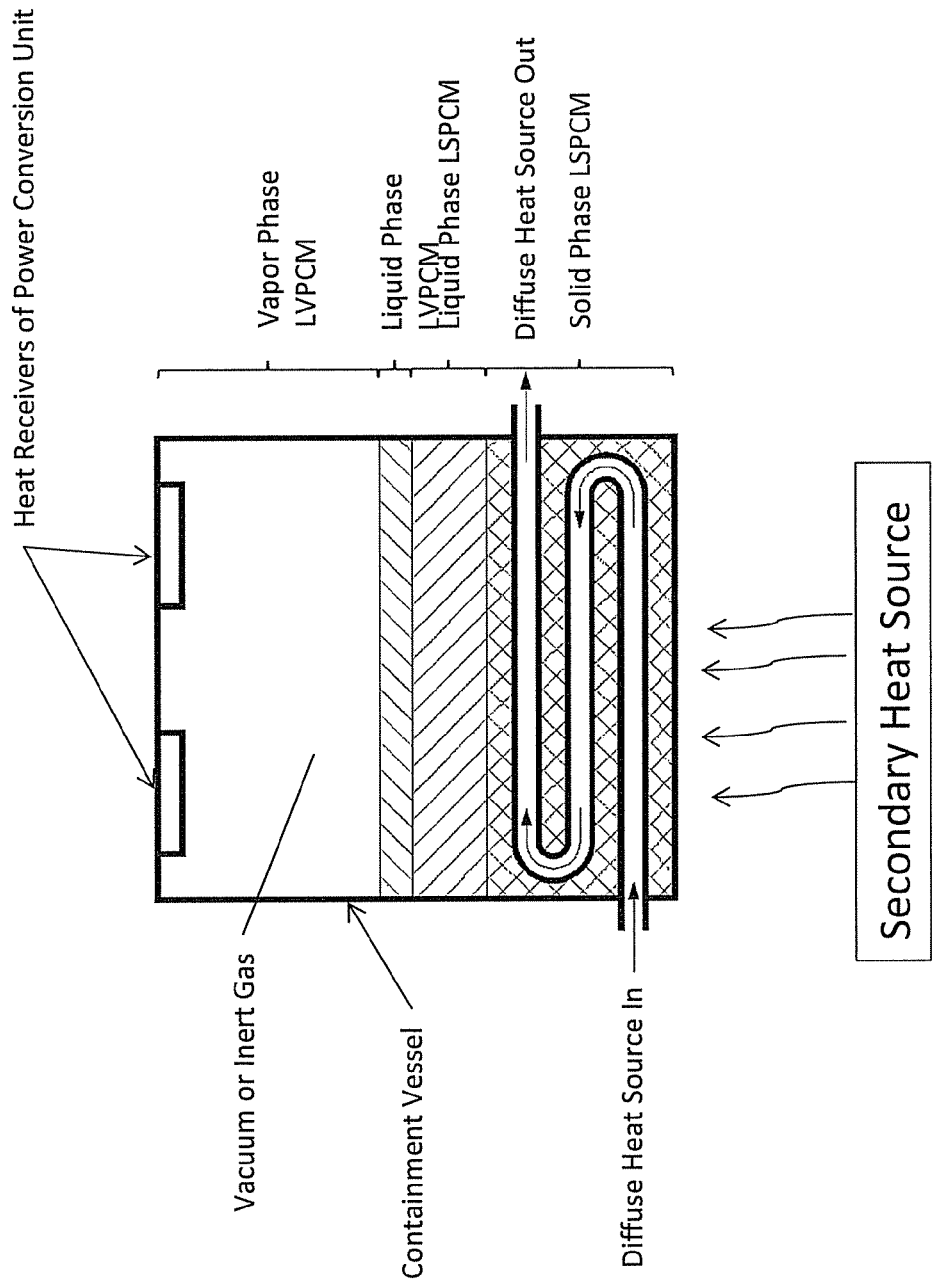

In another embodiment illustrated in FIG. 2C, diffuse heat energy in a gaseous or liquid flow stream may be applied to the LSPCM by means of a flow passageway that penetrates the containment vessel and is in intimate contact with the LSPCM for at least a portion of the heat source flow path. Fins or other structure may be added to the flow passageway embedded in the LSPCM to improve heat transfer to the LSPCM. This figure illustrates one option for disposing a heat delivery element in the vessel to transfer heat to the LSPCM.

When combined with an optional secondary heat source that can be separately applied, for example across the containment vessel wall as shown, a hybrid fuel system results. As an exemplary embodiment, the external heat input is concentrated solar energy and the internal heat source is a combustion gas stream. According to this embodiment a solar/fossil fuel hybrid results in which the fossil fuel is used only when the solar input and residual liquid LSPCM are not available. This type of embodiment is useful, for example, in a utility baseload power solar installation where continuous or dispatchable power is required. Such a hybrid system provides power on demand. With sufficient volume of LSPCM, during days with no cloud cover and sufficient solar heat input, the system produces clean green solar power 24 hours a day. For cloudy conditions, the fossil fuel source can be implemented to provide continuous power while producing a minimum of greenhouse gas emissions.

A further alternative embodiment is to cascade a diffuse heat supply system in series using two TES systems designed to optimally operate at different temperatures, wherein the first TES extracts the heat energy at a relatively high temperature level, and the exhausted heat flow from the first TES is directed through a second TES that extracts additional heat at a lower temperature using appropriate PCMs and PCUs for each temperature. Thus, two of the devices shown in FIG. 2C can be combined to produce such a system. This greatly increases overall system efficiency and enables a maximum extraction of available heat from the diffuse heat flow stream.

Figure 2D:
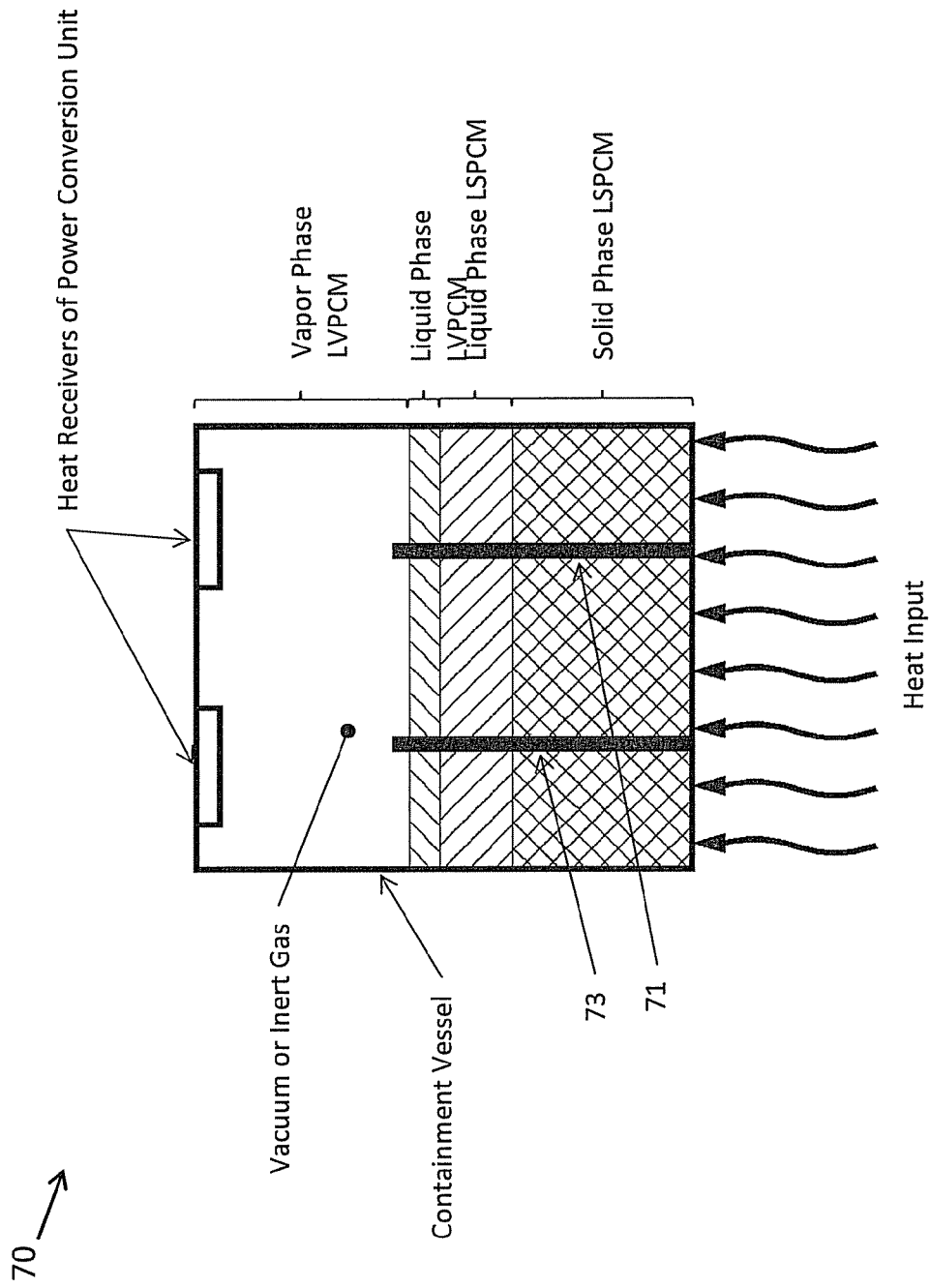

FIG. 2D illustrates a device 70 having an optional element that can be applied to any of the other configurations shown in FIGS. 2A-2C and described below. This optional element includes one or more thermal conductivity structures 71, 73 that are disposed from substantially the bottom of the LSPCM to substantially the top of the LSPCM. The purpose of this added element is to provide an escape path for the initially melted liquid LSPCM to reach the LVPCM region. Since the LSPCM expands upon melting, it could in some cases exert excessive stresses on the solid LSPCM or container materials if there is no place for it to move to relieve extra pressure. For many LSPCM choices, its physical structure will easily fracture to create a normal escape path for the liquid, but this may not always be the case. An example of a desirable high thermal conductivity element is a heat pipe, which maintains near isothermal conditions along its length. Structures 71 and 73 can also be a solid material such as copper or another suitable metal.

In one embodiment, the high thermal conductivity element, such as a heat pipe, that maintains near isothermal conditions along its length and is disposed from near the bottom of the LSPCM to near the top of the LSPCM. The purpose of this is to ensure that when heat input melts LSPCM near the bottom of the solid portion that an escape path is available for the increased volume of the liquid to reach the top of the LSPCM where it can contact the LVPCM without causing excessive stress on any of the system components. Typically, these structures 71, 73 are optional and not generally required.

The embodiments described herein address various problems relating to the transfer of heat to and from the PCM. For example, one conventional problem is that some thermal storage systems require heat pipes or similar devices internal to the containment vessel to mitigate the low thermal conductivity of typical thermal storage materials. The present approach overcomes various heat pipe specific problems. With heat pipes, the temperature at the heater head or heat receiver drops during the solidification phase because PCM increasingly freezes out on the heat pipes and forms an insulating layer as the proportion of molten PCM decreases. With the methods and devices described herein, the frozen PCM sinks to the bottom of the PCM container because it is denser than the liquid, and the second PCM stays at the top of the containment vessel because it is less dense than the liquid or solid first PCM. As a result, the heat receiver of a PCU will remain at a substantially constant temperature near the PCM melt/freeze temperature as long as there is any liquid phase of the first PCM remaining.

In one embodiment, a PCM such as a salt that solidifies during any point in the storage or heat transfer cycle will gravitate to the bottom of the containment vessel. The solidification process then takes place gradually from the bottom of the containment vessel upwards. This is in contrast to other systems that use heat pipes to extract the heat from a salt, wherein the salt freezes first on the heat extraction regions of the heat pipes and builds outwardly from there with ever increasing insulating effect to reduce the temperature of the stored heat that is actually supplied to the heat receiver of the energy conversion device.

Thus, the embodiments described herein optimize engine efficiency over the latent heat extraction period because efficiency is highest at the higher temperatures near the PCM melt point. One issue with this approach is that certain embodiments are orientation sensitive because the heat receiver has to remain near the top of the TES module to ensure that it is in the second PCM vapor region so no PCM freezes out on the heat receiver to form an insulating barrier. This may limit container geometry and how the TES/PCU system module can be integrated with a dish concentrator system. As a result, in some embodiments the combination TES/PCU system will be on the ground, but a suitable vapor volume and engine integration configuration can enable appreciable operating angular positions as described below and shown in the figures.

Figure 2E:
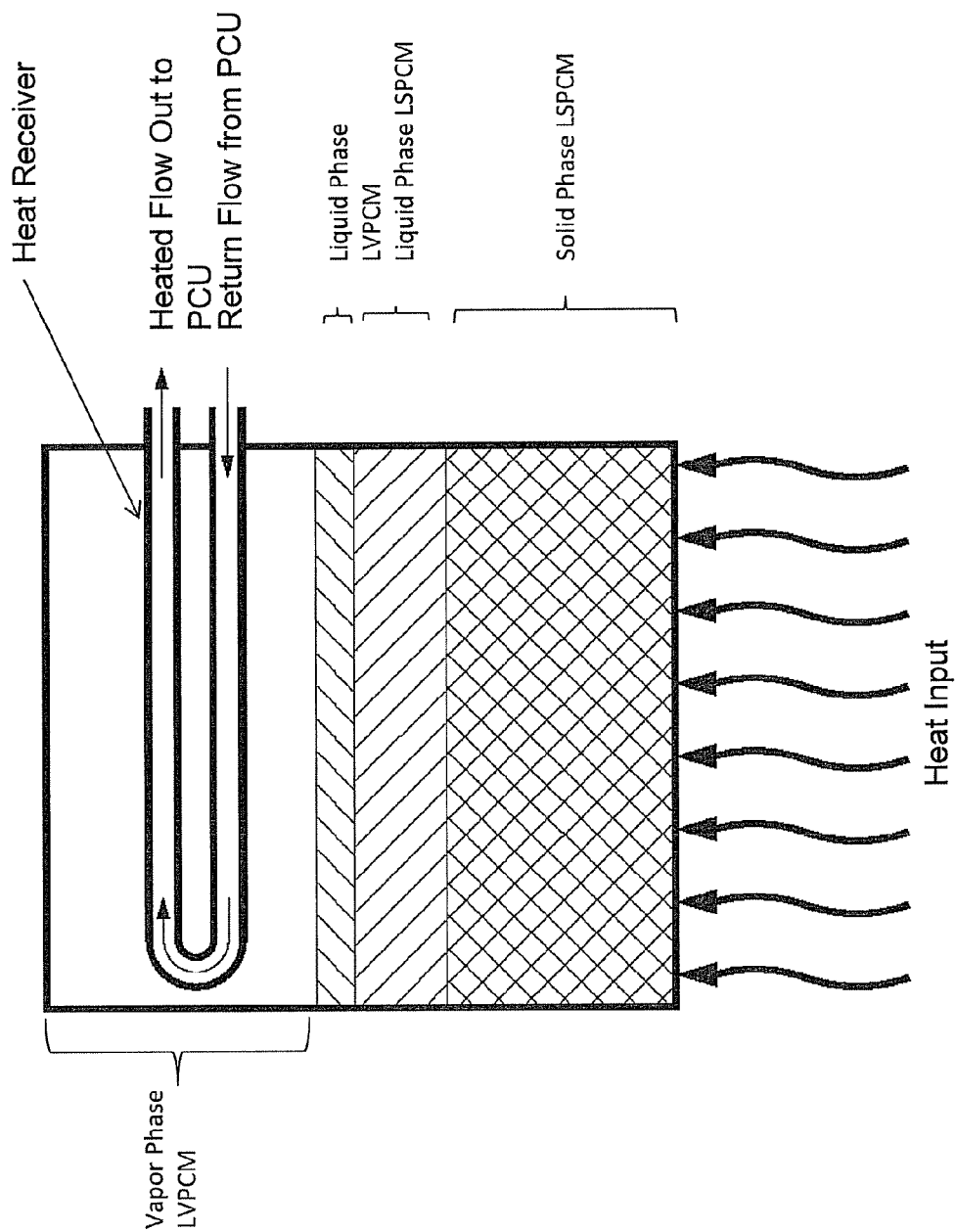

Heat receiver configurations in the vapor zone are very flexible and can be readily adapted to specific needs of the PCU in various embodiments of the invention. FIG. 2E illustrates this point. As shown, the other components including the phase change materials are analogous to those shown FIG. 2A, but the heat receiver is configured differently. This schematic representation of a heat receiver that is disposed in the vapor zone as a manifold or tube is appropriate for the heat receiver to provide a heated fluid for a Brayton, Rankine, Stirling or other PCU. The embodiment shown can function as a steam boiler for a Rankine cycle PCU, or as a gaseous fluid flow heater for a closed cycle Brayton PCU or as a representative heater tube of a Stirling PCU which would typically use a plurality of heater tubes.

The systems, methods, and devices illustrated in FIGS. 1-2E described above can be implemented with various heat sources, heat source interfaces, and PCUs. Several embodiments that use solar radiation as the initial heat source prior to concentrating it with a dish or field of mirrors as the heat source interface are described below. Other embodiments include manifolds or pipes as heat source interfaces to deliver heat within the containment vessel. As discussed in more detail below with FIG. 3A and other solar-based system embodiments, there are numerous applications for TES devices.

Delivery of heat to the TES from the solar concentrators is also more straightforward than with existing systems. This heat can be delivered to any portion of the solid first PCM, preferably including the lower regions of the containment vessel so that all the first PCM melts before the bulk temperature begins to increase above the melting point.

As heat is applied to the solid PCM, for example with a coiled pipe, other manifold or other heat transfer interface that carries heat transfer fluid and is buried in or otherwise displaces the PCM (similar to the embodiments shown in FIGS. 2C and 3B), the solid PCM immediately adjacent to the pipe or manifold will melt first. Since the liquid PCM typically has lower density than the solid phase, it will expand around the pipe and form cracks in the solid PCM. This liquid will then migrate through such cracks to the lowest point of voids below the coil and up through the solid to the top of the PCM region. There will therefore be a layer of liquid PCM above the solid PCM at a relatively early stage of the melting process.

In one embodiment, from this time on, melted LSPCM will cause the LVPCM to evaporate, enabling delivery of heat, in the form of condensing vapor, to the heat receiver of the ECA. As heat is extracted from the LSPCM during this heating process, it will solidify and sink to lower regions of the storage container where it can in turn be melted again. This gravity aided melting process makes it much easier to get the heat into the PCM with means such as pumped loops or heat pipes, and eliminates the necessity of delivering heat simultaneously to multiple regions of the PCM to ensure proper melting. Heat can also be added from outside the TES material container across the vessel wall, preferably in the lower portions of the region where the PCM is stored.

Heat can also be applied directly to the PCM from an external source without the necessity of penetrating the PCM storage module with distributed heat input. This would be particularly valuable for central receivers where the PCM can be located in direct contact with the solar receiver. It can also be used for hybrid systems where a combustor is used to provide heat for system operation, particularly during periods of extended unavailability of the solar resource. The combustion heat can be applied externally to the heat storage container by means of direct combustion gases or a radiant burner as discussed herein, or directed as needed through combustion gas flow channels buried in the PCM. With this as further background regarding embodiments of the invention, it is worthwhile to consider various dish concentrator-based embodiments.

Figure 3A:
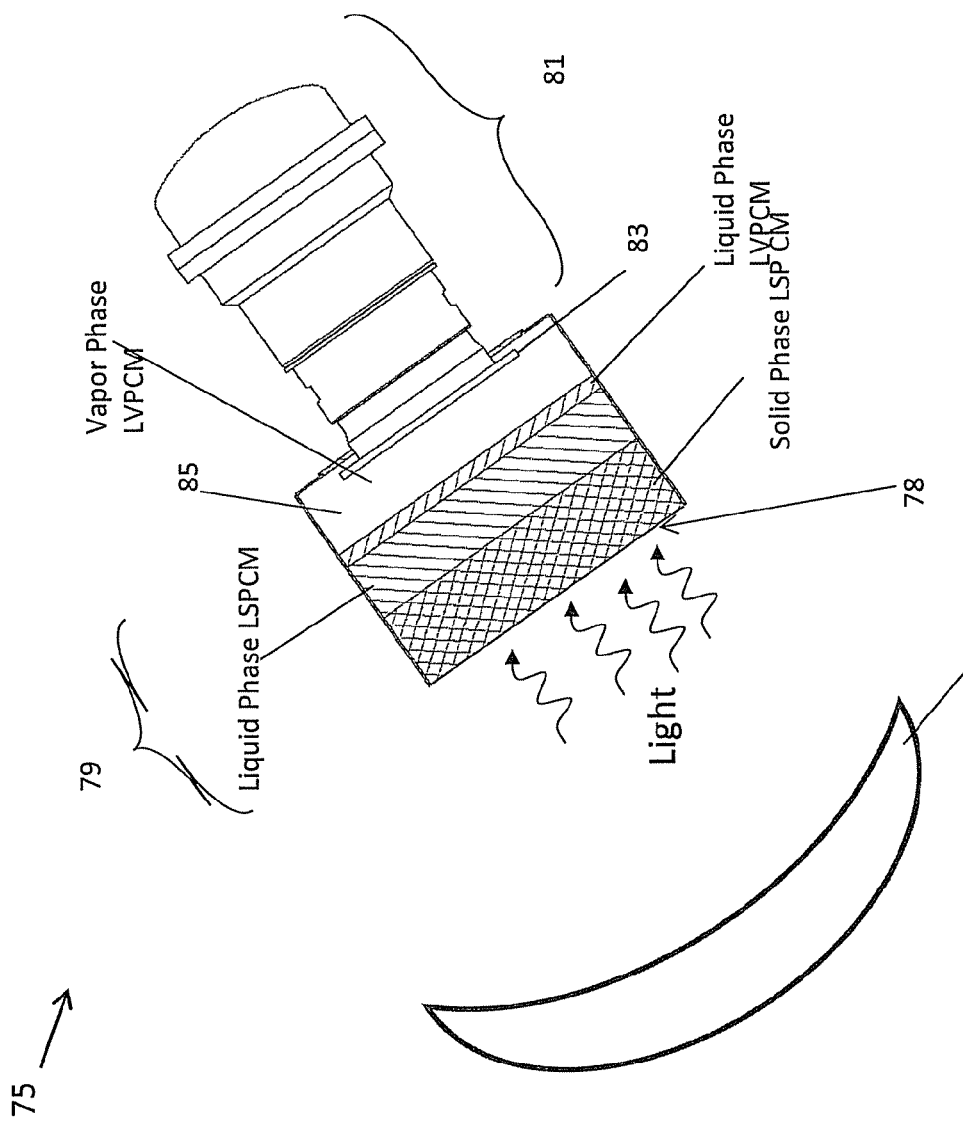
FIGS. 3A to 3C are various schematic diagrams illustrating thermal energy source, storage and transfer devices which are thermally coupled to energy converting apparatuses in accordance with an illustrative embodiment of the invention.

FIG. 3A shows an electric power generating system 75 that includes a solar concentrator 77 such as dish, trough or other heat transfer interface that directs light to a heat receiving surface 78 of a TET 79 that is coupled to a PCU 81. As shown, the PCU is a Stirling cycle-based device solar ECA.

An example of such a PCU is described in U.S. Patent Application Pub. No. 20100212656, the disclosure of which is herein incorporated by reference in its entirety. Although shown as a Stirling engine-based PCU, any suitable PCU can be used. In some embodiments, the Stirling engine-based PCUs and related system components use a working fluid (typically air, Helium, Nitrogen or Hydrogen gas) in a closed cylinder containing a piston. As part of its operation, the expansion (heating) and contraction (cooling) of the gas drives the piston back and forth in the cylinder. The work performed by this piston-motion is used to drive a generator (such as linear alternator) and produce electricity or to create pressure waves to drive a compression process. In one embodiment, a plurality of free pistons is used for such a given PCU or a plurality of PCUs can be used.

The PCU 81 has a heat receiver 83 such as a plate or heater head that is disposed in an upper zone or space 85 defined by the inner surface of the containment vessel of the TES where the vapor phase of a PCM can transfer heat to the receiver 83. With respect to the PCM shown, the phase changes occur in response to incident heat from the concentrator 77 consistent with the description provided herein in various embodiments.

Figure 3B:
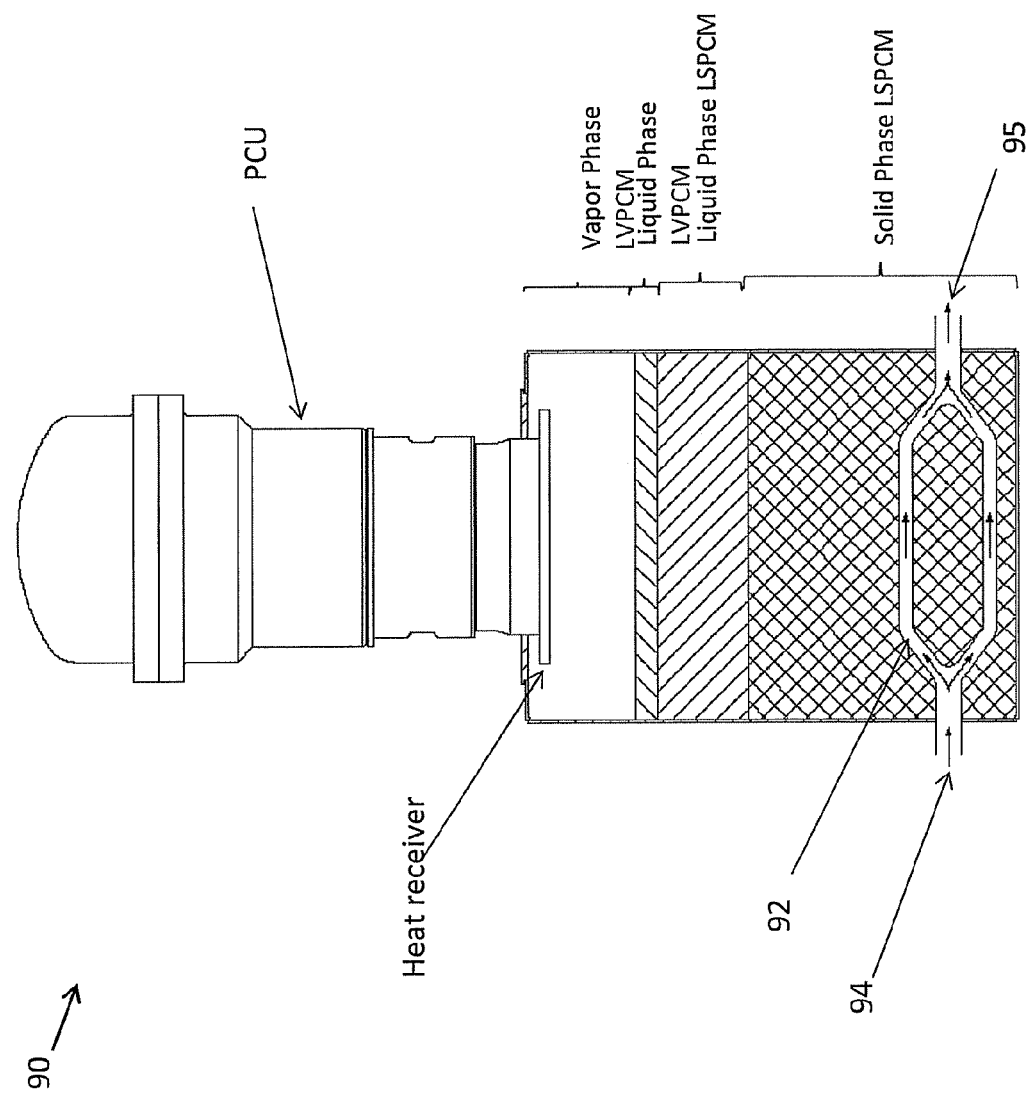

FIG. 3B shows an energy conversion system 90 that includes a PCU having a heat receiver disposed in a containment vessel. The containment vessel includes the PCM as shown. The system includes a manifold that is embedded or disposed in the first PCM, the LSPCM, shown as the bottom layer in the TET. Specifically, the manifold 92 has an input port 94 on the left and an out port 95 on the right. With respect to port 94, hot fluid or gas from a heat source flows into the manifold 92 and then out through port 95 to transfer heat to the LSPCM adjacent to the manifold embedded in first phase change material. In turn, this heat melts a portion of the solid phase LSPCM, which in turn heats the second PCM. As shown in FIG. 3B, a reduced temperature fluid or gas leaves from outlet port 95 after transferring heat to the first phase change material. In one embodiment, this reduced temperature fluid or gas returns to the heat source for reheating.

Figure 3C:
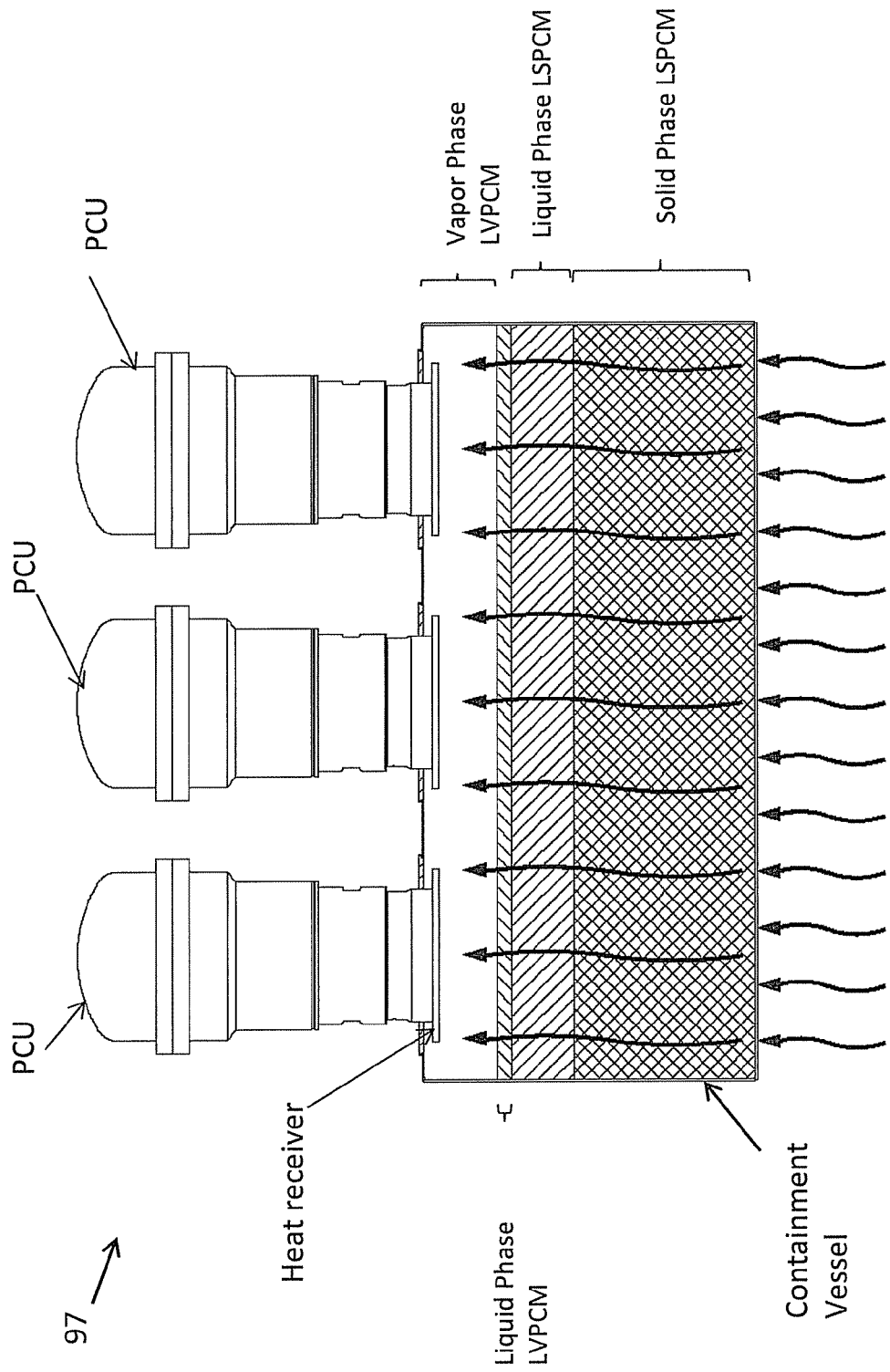

FIG. 3C shows an energy conversion system 97 that includes a plurality of PCUs in thermal communication with a thermal energy transfer device that includes the PCMs shown within a containment vessel. By increasing the size of the containment vessel and the number of PCUs, it is possible to store thermal energy in the TES that allows for power generation for longer periods of time, even time periods of 24 hours per day or longer when sunlight or other heat sources are not available.

Figure 4A:
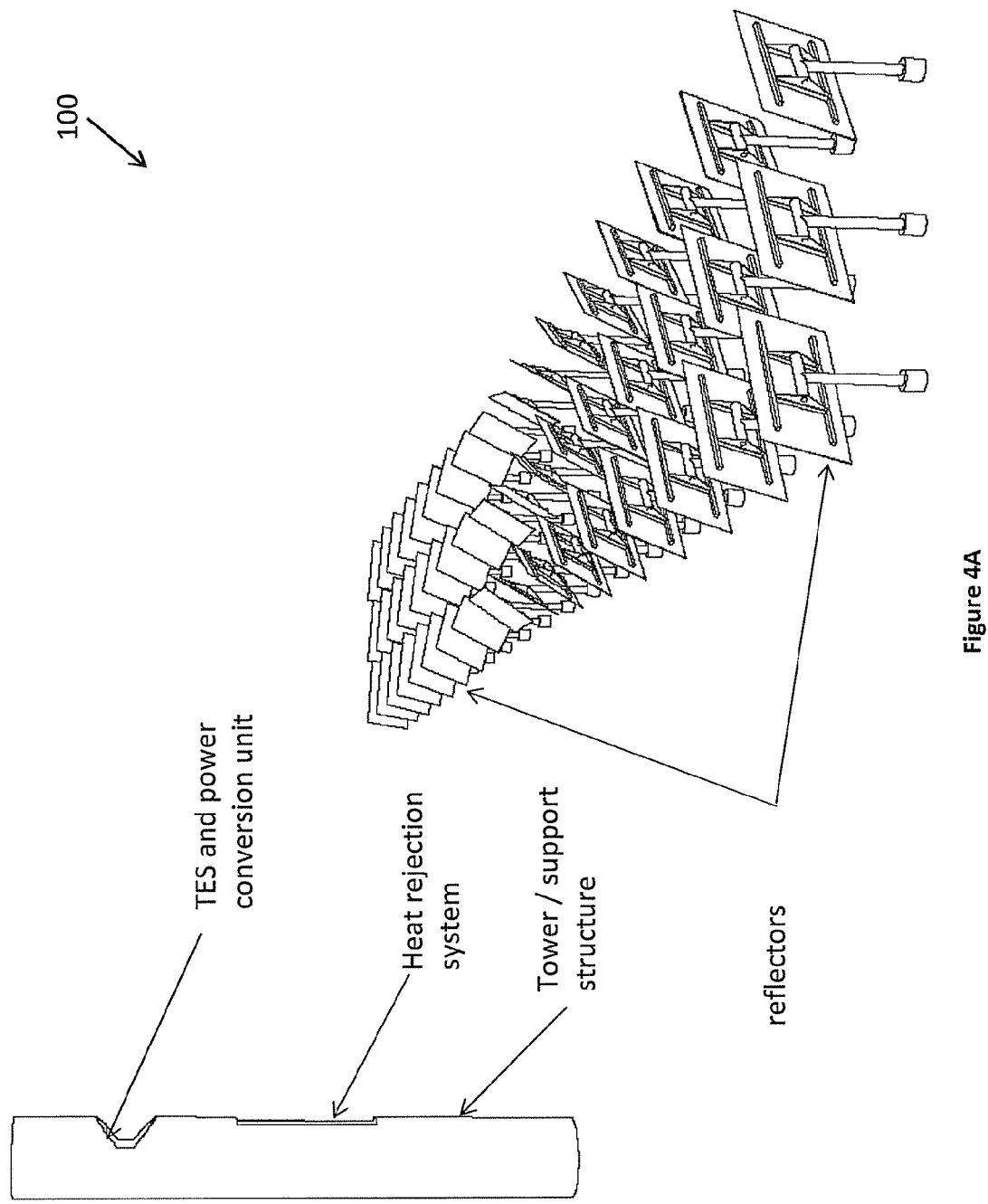
FIGS. 4A and 4B are schematic diagrams illustrating solar energy systems using a plurality of mirrors and an elevated thermal energy transfer device, in accordance with an illustrative embodiment of the invention.
Figure 4B:
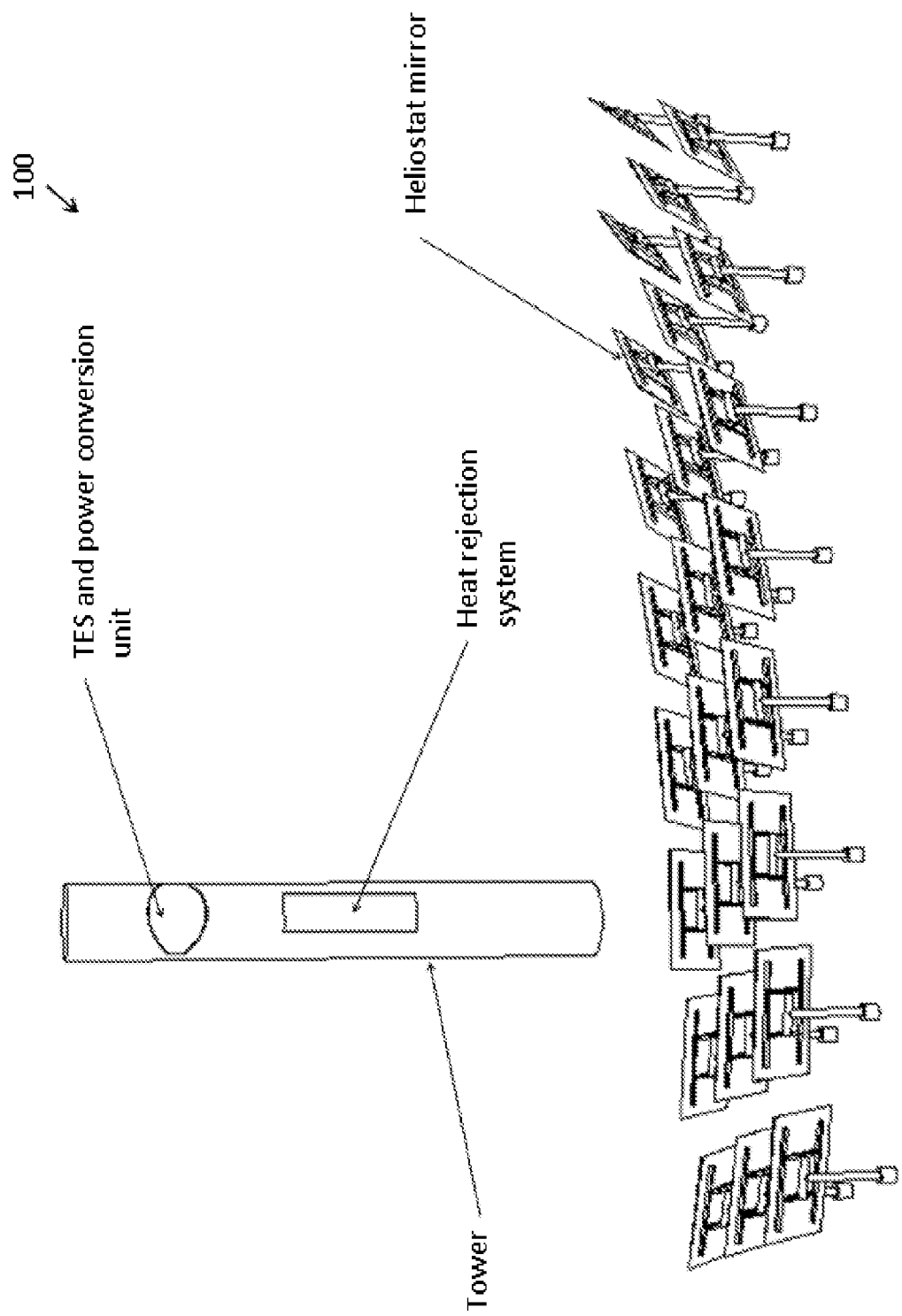

FIGS. 4A and 4B show a power generation systems 100 that include a thermal energy storage device embodiment, such as those described herein and depicted in the figures in an elevated position in a tower or other support structure. An array of reflectors such as Heliostat mirrors direct sunlight to a receiver disposed in the tower. Specifically, a TES device thermally coupled to a PCU is disposed in the tower and receives the sunlight which enters the TES and is transferred to the PCU in a manner consistent with the descriptions above. With this heat energy, the PCU generates electrical power. In one embodiment, a cooling or a heat rejection system is incorporated into the tower to reject excess heat received from the reflectors. Any of the TES units described and depicted herein can be integrated with the tower. In some embodiments, a light receiving element is disposed in the tower which collects and relays the heat to a TES that is within, next to, or underground relative to the tower. Any of these implementations can also include a hybrid combustion option as previously described to provide power during extended cloudy conditions.

Figure 5A:
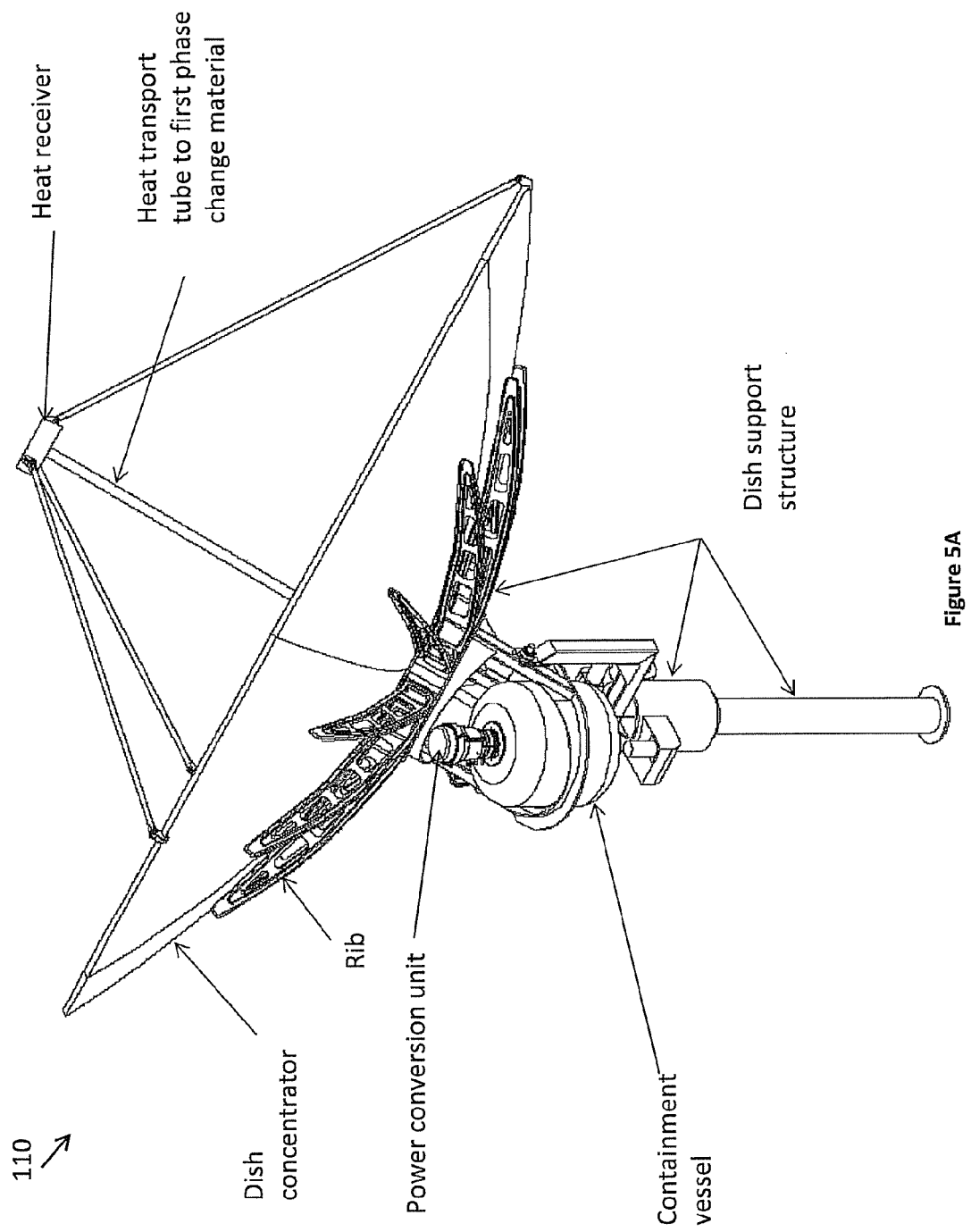

FIGS. 5A-5C show another power generation system 110 that converts sunlight into electricity. FIG. 5A shows a TES system 110 mounted on dish concentrator at an intermediate tilt position. FIG. 5B shows the TES system 110 mounted of FIG. 5A at a first extreme tilt limit. Similarly, FIG. 5B shows the same TES system of FIGS. 5A and 5B at a second extreme tilt limit. For a dual axis solar dish tracking system, operation between these extremes enables tracking the sun at any position above the horizon without having the heat receiver move out of the vapor space.

As shown in FIG. 5A, a containment vessel having the two PCM shown in FIG. 2A is in thermal communication with a PCU. A Stirling cycle-based PCU is shown. However, any suitable PCU can be used in the system 110. The containment vessel and the PCMs disposed therein operate as a TET device shown and described with respect to FIG. 2A. In general, the containment vessels used in various TET embodiments are insulated to prevent heat loss and to maintain the phase change cycle associated with the PCMs disposed therein. The dish concentrator is support by a plurality of radially directed ribs and subsystems that form a chassis. A pier or other dish support structure elevates the dish concentrator and the combined PCU and TES module.

Figure 6A:
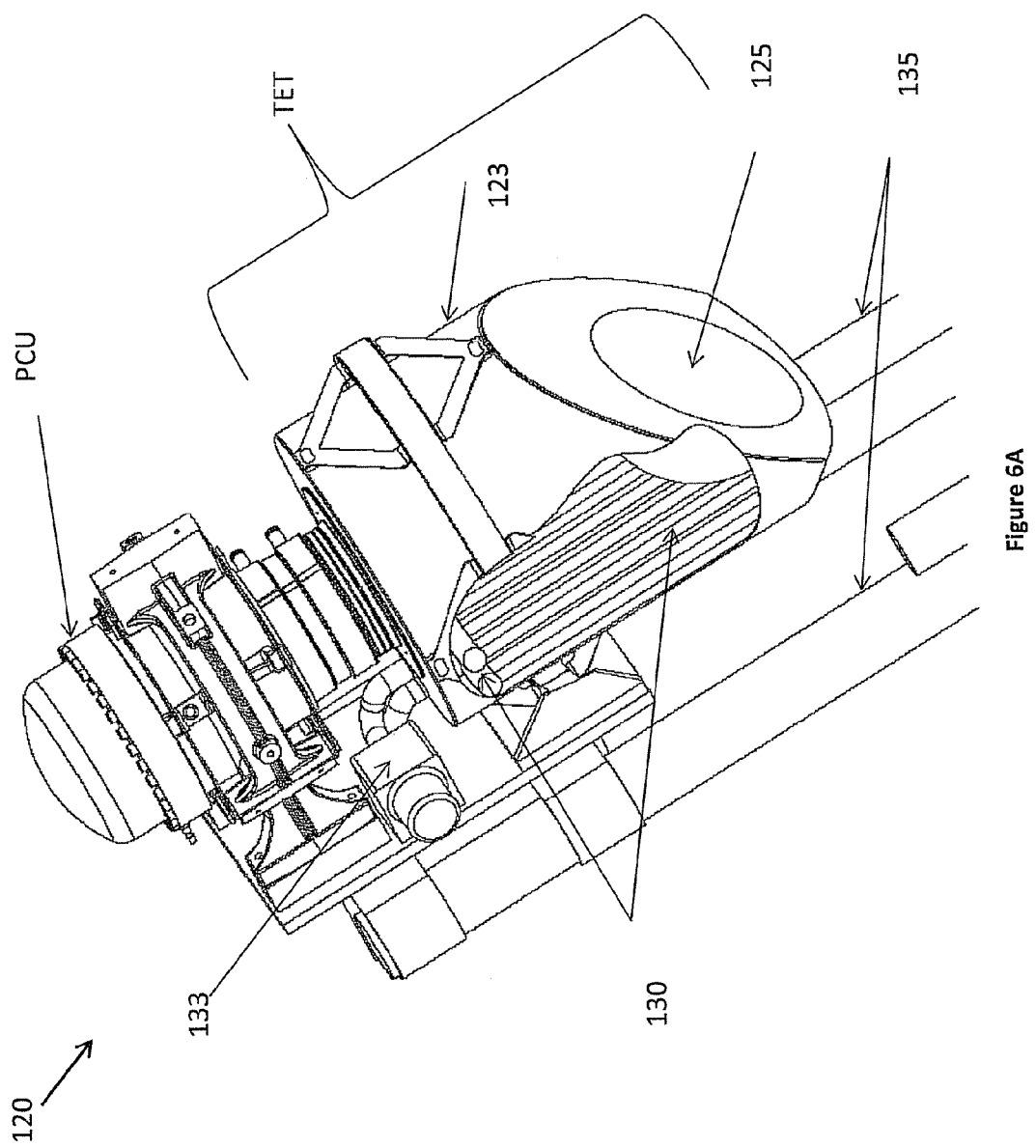

As shown, the PCU is mechanically connected to the containment vessel and located in a position near the support post of the dish support structure to reduce the TES support structure requirements. When sunlight is concentrated by the dish, it is directed to a focal point or region in front of the dish at the location where the heat receiver shown is positioned. A heat transport tube, which may for example be a heat pipe, loop heat pipe or pumped loop, is used to transfer the concentrated solar energy from the heat receiver to the TES. In some embodiments, the dish concentrator and the PCU are oriented relative to each other such that sunlight is focused directly on a heat receiver that serves as the heat source for the TES. An example of this is shown in FIGS. 6A and 6B where heat is directed into an aperture, plate, surface or heat receiver that is in thermal communication with a TES device embodiment having at least two PCMs. The heat receivers and heat exchangers used within and exterior to the containment vessel can be integrated with mechanical and electromagnetic pumps and pumped loop heat pipes in various embodiments as appropriate.

In the embodiment shown in FIGS. 5A-5C, the sunlight is directed to the heat receiver which transfers thermal energy along the heat transport tube to the first PCM disposed within the containment vessel. Thus, incident sunlight is directed into a containment vessel having two phase change materials that change phase and couple heat into the PCU using a vapor phase of the second PCM.

With respect to FIGS. 5A-5C, in one embodiment, the surface area of the dish is increased to be double the size (or another multiple of dish size) that would be used if the TES was not present. This is possible because the additional light directed to the focus point can be stored rather than lost as waste heat.

In one embodiment, the containment vessel includes NaCl/NaF eutectic salt as the first PCM, Na as the second PCM, and sufficient void volume to enable ±45° tilting. In one embodiment, a cylindrical TES containment vessel is used with a dish concentrator. However, other geometries can be used for the containment vessel.

In FIGS. 5A-5C, a high thermal storage capacity system on a dish concentrator is shown. In these embodiments, the TES and PCU are mounted near the support post rather than at the heat receiver because of practicality of supporting its potentially large size and weight. This mounting configuration also reduces the shadow cast on the dish. Further, the systems shown in FIGS. 5A-5C are mounted at an angle as indicated by FIG. 2B to maintain the heat receiver position in the vapor space. The effect of tilt angle is specifically illustrated by the limiting cases of FIGS. 5B and 5C, which represent the extreme vertical and horizontal limits for the dish axis, between which it is possible to aim at any point above the horizon and have the TES system continue to function properly.

FIG. 6A shows a perspective partial cutaway view of a hybrid power generating system 120. Specifically, a close-up view of a hybrid TES system is shown in FIG. 6A. In FIG. 6B, the same TES system, 120 is shown mounted at the focus of a dish concentrator as part of an overall system 150. As shown, a containment vessel 123 defines a heat receiving surface 125 that can be a heat receiving region, heater receiver, heater head, aperture, or other suitable element for receiving solar energy and transferring it to the vessel 123. Within the vessel 123, there are two phase change materials that change phase as outlined herein.

An internal heat exchanger manifold 130 for combustion gas heat transfer to a first phase change material is also included. With the addition of this manifold, similar to the embodiment described with respect to FIG. 3B, a hybrid device is shown such that when solar energy is not available fossil fuels or other fuels can be reacted to produce heat which will be transferred through the PCMs to the PCU. As shown, the PCU is connected to the vessel 123 and the heat receivers of the PCU are disposed within a volume of the vessel 123 defined by an inner surface, cavity or chamber. A burner heat source 133 for hybrid operation is in thermal communication with the manifold 130. The PCU and TET are supported by two support arms 135 that connect to or are part of a boom other structure for orienting the system 120 relative to a dish concentrator 140 or other heat source. For dish 140 embodiments, a biaxial drive 142 can be used to move the dish and track the sun.

FIG. 7A shows a power generation system 160. As shown, a containment vessel 163 has a plurality of PCUs integrated with and disposed thereon. For each PCU, a heat receiver (not shown) of each PCU is disposed within the containment vessel 163. In one embodiment, the PCUs are 30-kW Stirling cycle-based devices. The system 160 can be coupled either with one or more dish concentrators or troughs to provide the heat, or can be used with a central receiver system. In the latter case of a central receiver system such as that shown for example in FIGS. 4A and 4B, the engine/TES module can be placed either on or below ground level, or placed directly on the tower for the efficient close-coupled integration of the TES with the heat source.

A partial cutaway view in FIG. 7A illustrates an internal heat exchanger 165 from the heat source to first phase change material. As shown, in one embodiment, this heat exchanger 165 is a coiled tube embedded in the first PCM. The system 160 includes a pump 167 for the heat source fluid. In one embodiment, this system 160 uses a high temperature mechanical or electromagnetic drive pump 167 for either a liquid metal or molten salt pumped loop. NaK (a eutectic mixture of 22% Na and 78% K) is used as the liquid metal in a preferred embodiment because it remains molten under virtually all normal environmental conditions and does not precipitate problematic deposits on pump components.

The solar input for this system 160 can be either from one or more dishes, a parabolic trough field or a central receiver. As illustrated, a first conduit or pipe 170 receives the heated NaK and transfers heat to the salt in an upper coil that spirals inward, where it then bends downward and spirals outward in a lower coil to where the pump 167 returns the cooler NaK to the solar receiver. A second pipe or conduit 169 conducts the warm fluid (temperature reduced fluid) return to heat source. As shown the operation of this embodiment is similar to the schematic shown in FIG. 3B. The PCMs used in the system 160 operate as shown in FIGS. 3B and 2A and as described in relation thereto.

Figure 7B:
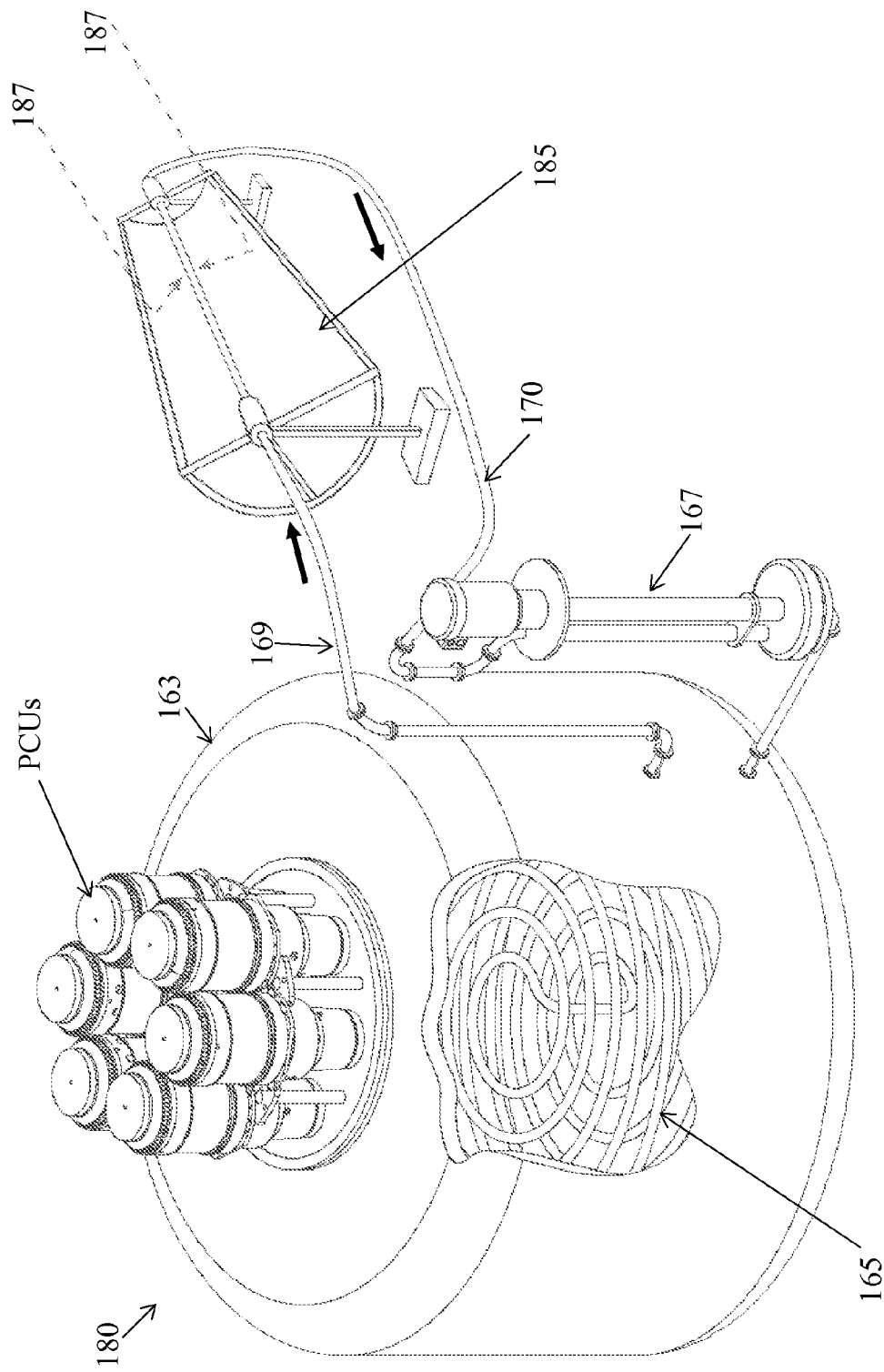

In the case where this system 160 is mounted directly on a tower as in FIGS. 4A and 4B, the close integration of the TES to the receiver can dispense with the pump, by heating the salt directly. FIG. 7B shows a system 180 that is the same as that described and depicted with respect to FIG. 7A except that an exemplary heat source 185 is shown. The heat source 185 depicted is a concentrated solar parabolic trough that receives light 187 and uses that to heat a fluid that enters the manifold 165 through conduit 170. Any suitable heat source 185 can be used in various embodiments.

Figure 8:
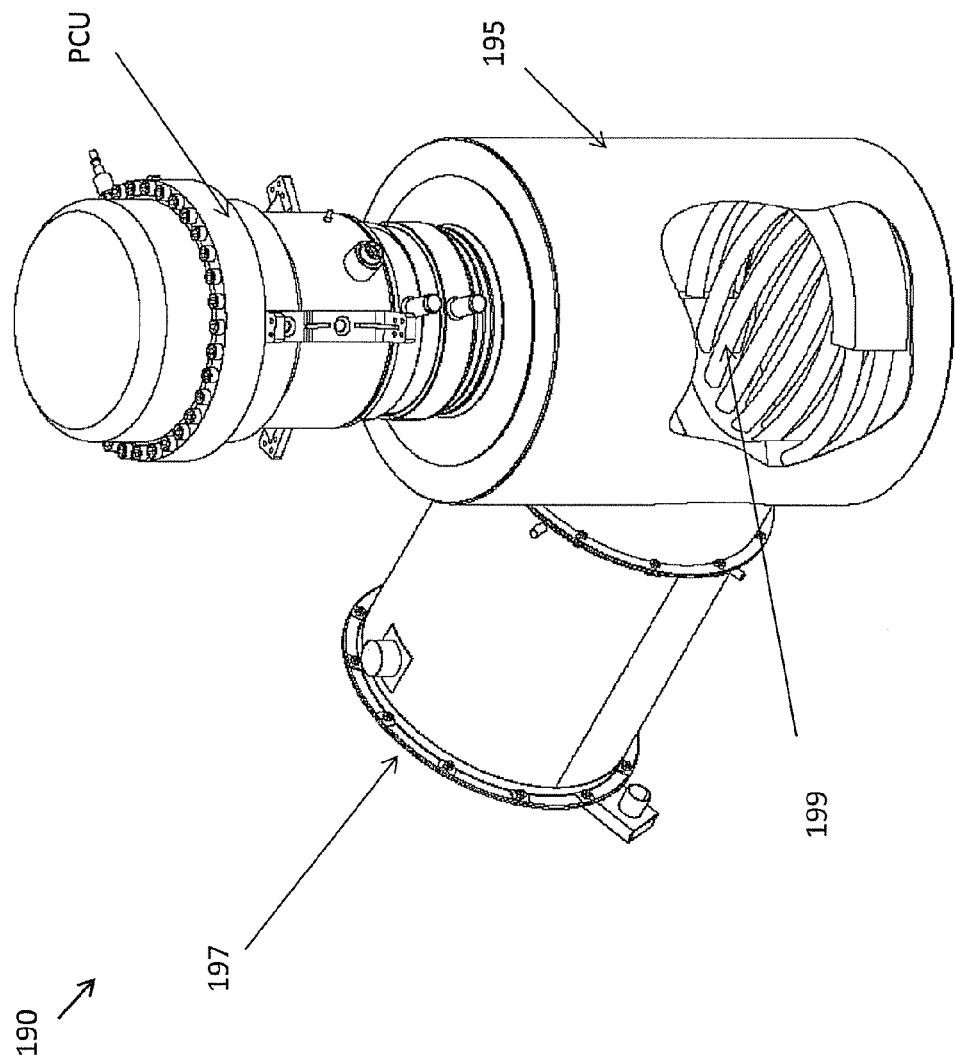
FIG. 8 is a schematic diagram illustrating an electricity generation system that receives heat from a combustion source in accordance with illustrative embodiment of the invention.

FIG. 8 shows yet another power generation system 190. As shown, a PCU having at least one heat receiver is thermally coupled to a containment vessel 195 such that at least one heat receiver is disposed therein. Any suitable PCU can be used. As shown, the PCU can be a Stirling cycle-based PCU. The vessel 195 includes two or more PCMs and operates consistent with the embodiment described in FIG. 2A and elsewhere herein.

A burner 197 for a combustion heated system is shown as a primary or secondary heat source. Thus, fuel such as gasoline, diesel or other fuels can be burned using the burner 197 to heat the PCMs in the vessel 195 and thus transfer heat via vapor to the PCU. In addition, an internal heat exchanger manifold 199 for combustion gas is disposed in the vessel 195 in one embodiment for heat transfer to a first phase change material.

Figure 9A:
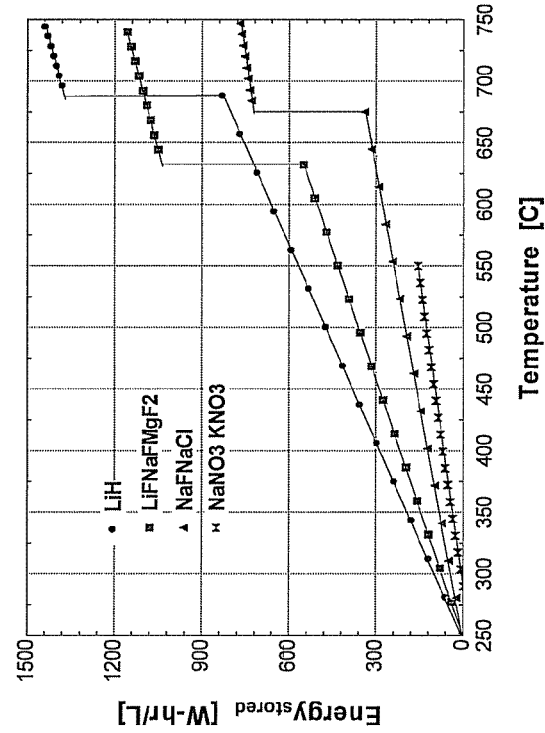
FIGS. 9A and 9B are comparative plots that include energy storage details in accordance with illustrative embodiments of the invention.
Figure 9B:
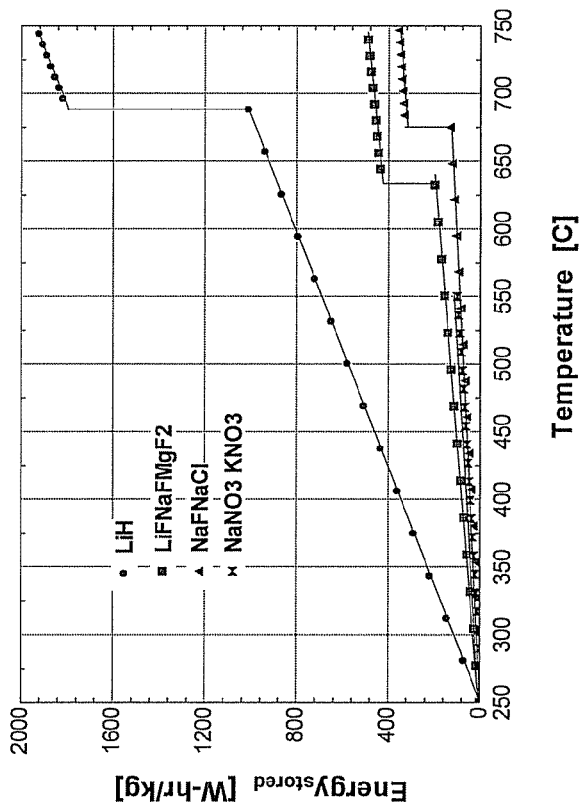

Utilization of the latent heat of fusion in a PCM TES device greatly improves the specific weight and volume relative to single-phase TES systems and enables the practical use of an integrated receiver/TES/engine module. FIGS. 9A and 9B provide a quantitative comparison of the total energy storage capacity of three PCMs to the energy storage in a typical liquid salt storage system for troughs. Specifically, the incremental energy storage capacity of exemplary PCM TES salts and a typical trough liquid salt are compared by weight in FIG. 9A and by volume in FIG. 9B. The stored energy in W-hr/kg and W-hr/l is plotted over a range from the minimal functional operating temperature of 250° C. for a 3-kW engine Stirling engine-based PCU to its maximum temperature in the 700 to 750° C. range.

Lithium salts generally have the best energy storage density, but they also can be relatively expensive compared to other salts. Therefore, a non-lithium NaF/NaCl alternative is illustrated for comparison. While it provides only about half the total volumetric storage capacity of LiH, it still provides about 5 times the volumetric storage capacity of the liquid-phase $NaNO_3$/$KNO_3$ salt used in a high-temperature advanced trough TES test loop, in which the salt tanks operate at 270° C. and 550° C. There are many pure and eutectic salts, mostly alkali halides, with attractive properties to provide the TES function. Examples include NaF/NaCl, $MgCl_2$, NaF/$CaF_2$/$MgF_2$, KF/NaF/$MgF_2$, KF/NaF, KF/$BeF_2$, $BeF_2$, NaF/$MgF_2$, LiF/$MgF_2$, $Li_2CO_3$, LiH, LiF/NaF/$MgF_2$, LiF, NaCl/$NiCl_2$, LiOH/LiF, LiOH, and LiF/LiCl.

Implementation challenges with phase change TES include low salt thermal conductivities and a large volume increase during melting. The low conductivity means that both the heat delivery means and heat extraction means are distributed, in some embodiments, throughout the salt region so that thermal conduction through the salt is over short distances to avoid large temperature drops. No matter where the salt is at any time, there must be adequate heat transfer surface to reach it. One consequence of designing to accommodate this condition is that a substantial portion of the TES volume is occupied with heat pipes or other heat exchange mechanisms to and from the salt, so the container size has to be increased to accommodate the desired volume of TES. The typically 25% or more density increase of solid compared to liquid for a given salt means that during heat extraction, while solidification is taking place, significant void volumes are introduced. Depending on the mechanisms for heat delivery to and extraction from the salt, this creates various degrees of difficulty. Both of these issues are greatly mitigated as a result of the use of two or more PCMs having different density characteristics that can change state and mix in an integral manner in a containment vessel as described throughout this application.

One reason for this is that as heat extraction takes place by means of the liquid salt at its upper surface vaporizing the Na (or other PCM) liquid pool floating on it, with the resulting Na (or other PCM) vapor condensing on the heat receiver to transfer that heat to the PCU and condense the Na (or other PCM), which then returns to the liquid pool by gravity. As the liquid PCM imparts this heat to the Na (or other PCM), it cools and solidifies. Because of its higher density, it sinks to the bottom of the liquid pool. Thus, there is no solid salt layer formed that imposes a temperature drop at the heat extraction site.

Heat delivery is also more straightforward since it is only necessary to provide adequate surface area for heat delivery to the PCM in one location—near the bottom of the TES container where the solid salt will be located as long as there is any solid at all. One protocol for ensuring that the salt always freezes optimally in the TES container is to move the dish position to about 45° from the horizon after sunset such that the central axis of the TES is near vertical, while the engine is operating on stored thermal energy.

The first PCM is typically a solid (likely with liquid filled fissures or cracks), with a liquid salt layer floating on top of the solid, and with a layer of liquid Na (or other LVPCM) floating on the liquid salt (or other LSPCM). When heat is applied to the tubes or manifolds disposed therein, the salt adjacent to them is melted and migrates upward, while the solid portions settle downward. The liquid salt at the top gives up heat to vaporize the adjacent sodium, which causes that salt to solidify and drop to the bottom. The Na vapor will condense on the coldest surface to which it is exposed, in this case that is the PCU heat receiver. The Na (or other PCM) condensate returns to the Na (or other PCM) pool by gravity.

Additional Details of Suitable Phase Change Materials

Useful second PCMs for the temperatures associated with solar thermal systems most often include Na, K, and NaK. Depending on operating temperatures and other factors such as preferred density and phase change thermal transport properties, other examples include Li, S, and other materials commonly used in specialty heat pipes.

Embodiments for Energy Storage Using Phase Change Materials

Concentrating solar power (CSP) systems such as Stirling engine-based systems offers a big advantage over photovoltaic (PV) by using high temperature thermal energy conversion approaches that can provide heat energy as a useful byproduct. Another advantage of using heat is that it can also be stored to provide power conversion at times when the sun is not shining. This is in general far lower in cost than storing comparable levels of useful energy in electrical storage, as is required by PV systems.

One embodiment of the invention includes a combination of phase change salt energy storage intimately integrated with a liquid metal pool boiler that simplifies the problem of transferring heat into the salt from the heat source and out of the salt to the power generation system. It can also be applied to molten salt storage as well as phase change salt storage, or to other materials used for energy storage.

Another supporting technology is increasing the thermal conductivity of PCMs by adding nickel powder. Other known technologies that work in combination with the embodiments described herein to enhance performance of functionality are two phase liquid metal heat transport systems using heat pipe or pool boiler or thermosiphon components, liquid metal or molten salt pumped heat transfer loops, thermal to electric power conversion devices, and solar concentrators including parabolic dishes, parabolic troughs and central receivers. The same basic approaches can be used with materials other than salts and liquid metals.

Design Enhancements Relative to Heat Pipe Technology

Some thermal energy storage units incorporate heat pipes within the volume defined by a housing or chamber. These heat pipes include a liquid/vapor phase change material within them which gives them high effective thermal conductivity. Because of the typically low thermal conductivity of the TES phase change material surrounding such heat pipes, such heat pipes have to be extensively distributed within the volume inside the vessel such that there is not too much distance between the heat pipes in order to maintain reasonable temperature drops. Further, once heat pipes are extracting heat for delivery, the heat transfer media in which the heat pipes are disposed will generally first freeze out on the embedded heat pipe since that is where the latent heat of fusion is being extracted to transfer. As this material freezes around the heat pipe it forms an insulating layer around the heat pipe so that the temperature of the heat pipe continues to decrease as more of the thermal storage media changes from liquid to solid. Since the engine temperature is essentially the same as the heat pipe temperature, the engine temperature decreases to less efficient levels as the latent heat is extracted from the heat transfer media.

In contrast to that scenario, in the preferred embodiments described in this application, heat pipes are not required and instead the LSPCM and the LVPCM are integrally mixed in the containment vessel with a vacuum or inert gas. Thus, a layer or volume of LSPCM and a layer or volume of gas or a vacuum sandwich a layer of volume of LVPCM. Thus, the PCM can mix and move relative to each other. In one embodiment, this design not only eliminates the heat pipes, but also has a number of functional advantages. When the LSPCM is first heated and melting begins, the liquid quickly works its way to the top of the LSPCM where it contacts the LVPCM and causes it to evaporate by transferring its heat of fusion and therefore re-solidifying. That solid drops back down through the liquid layer and more liquid rises to the surface to continue the operation. In one embodiment, for this process to continue melting the LSPCM it is necessary that the heat input from the heat source be greater than the heat extraction by the PCU. Thus, during any of the melting and freezing phases of LSPCM operation, it is the liquid melting temperature that is evaporating the LVPCM such that the engine always operates at a near optimum temperature that is close to the LSPCM melt temperature through the entire operating cycle as long as there is any liquid LSPCM available.

Shear Force Mitigation Embodiments

There are some challenges associated with TES relating to melting of the first phase change material. Melting of the first PCM can impart stresses on the containment vessel. However, these stresses can be mitigated by adding one or more high thermal conductivity paths from near the bottom to near the top of the phase change material such as shown in FIG. 2D.

In one embodiment, the preferred approach is to provide heat for melting the phase change material at or near the bottom of the vessel. This can lead to excessive stresses if the phase change material is in a nearly complete solid phase and the expanded liquid has no easy path to the top of the TES device. As a result, selecting phase change materials based, in part, on tensile, compressive and shear strength in an effort to use PCMs that do not exhibit excessive stresses is desirable. Mitigating shear forces associated with the PCM is important. Selection of PCM that exhibit strong shear forces can result in the inner surface or bottom of the vessel bending or rupturing, or an embedded heat transfer tube such as in FIG. 2D being forced upward and overstressed.

In one embodiment, tapering the containment vessel walls such that any solid block or mass of PCM will pull away from the walls and create a liquid expansion path with a small displacement of the solid PCM mass is desirable. Increasing the thickness of the walls of the containment vessel can also mitigate the problem of shear stresses. In general, adding one or more closed heat pipes that extend from the bottom of the PCM to the top of the PCM layers is preferred as it will quickly melt the PCM all along its length, thus providing an escape path for the melting salt. In addition, in embodiments where the PCM is being heated internally with an imbedded manifold to transfer heat from a hot gas stream, pockets or voids left around the manifold pipes when the salt freezes or otherwise may be problematic. For example, when the PCM is reheated the manifold could locally overheat since there would be nothing to absorb the heat. This problem may be addressed by adding fins or other protuberances to the manifold tubing externally.

Thermal Energy Storage Method, System, and Device Embodiments

In one embodiment, the TES systems described herein will enable practical thermal storage of 12 hours or more. The incremental cost of adding more storage is minimal, as it can be achieved by adding more LSPCM and increasing the containment vessel volume. 3-kW-30-kW solar dish Stirling engine systems (and various larger and smaller systems) are suitable for integration with the TES technology described herein.

In the description, the invention is discussed in the context of Stirling engines; however, these embodiments are not intended to be limiting and those skilled in the art will appreciate that the invention can also be used for many types of energy conversion systems including multi-cylinder engines, whether Stirling cycle-based or otherwise, kinematic engines, steam- and water-based solar energy converting and storages systems, and other types of ECA wherein useful work or electricity is produced from a heat source.

The phase change salt model uses a NaCL/NaF eutectic mixture. The mixture has a heat capacity of 1300 [J/kg-K] a latent heat of 195 [W-hr/kg] and a melting point of 675 C. In one embodiment, one PCM is a NaCl/NaF eutectic salt and the other PCM is Na. In yet another embodiment, one PCM is a salt and the other PCM is NaK. To achieve the maximum benefits of operation afforded by a TES module in a standalone CSP system, a larger dish than normal for a given PCU capacity is used to collect sufficient thermal energy to operate the PCU normally all day in addition to storing energy for PCU operation time beyond daylight hours It should be appreciated that various aspects of the claimed invention are directed to subsets and substeps of the techniques disclosed herein. Further, the terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. Accordingly, what is desired to be secured by Letters Patent is the invention as defined and differentiated in the following claims, including all equivalents.

What is claimed is:

1. A thermal energy transfer system comprising:
a containment vessel defining a cavity, the containment vessel comprising an inner surface and an outer surface, the inner surface comprising a first surface and a second surface;
an elongate thermal conductivity element having a first end and a second end, the elongate thermal conductivity element disposed in the cavity;
a first phase change material having a first liquid density disposed in the cavity;
a second phase change material having a second liquid density, the second phase change material disposed in the cavity and adjacent to and in contact with the first phase change material, wherein the second liquid density is less than the first liquid density, the second end of the elongate thermal conductivity element is at least partially surrounded by the first phase change material, wherein the second surface is below a liquid of the second phase change material, and
wherein the first end is above the second surface and the second end extends from the second surface;
a vapor space adjacent to and defined by the first surface and the second phase change material; and
a heat receiver of a power conversion unit, the heat receiver disposed in the vapor space.

2. The thermal energy transfer system of claim 1 wherein the heat receiver is oriented within the containment vessel such that a vapor phase of the second phase change material condenses thereon.

3. The thermal energy transfer system of claim 1 further comprising a heat source interface in thermal communication with the first phase change material.

4. The thermal energy transfer system of claim 1 further comprising the power conversion unit.

5. The thermal energy transfer system of claim 1 wherein the first phase change material has a liquid density that is less than its solid density.

6. The thermal energy transfer system of claim 1 wherein the vapor space defines a vacuum or is filled with an inert gas.

7. The thermal energy transfer system of claim 4 wherein the power conversion unit is selected from the group consisting of a closed cycle heat engine, a Stirling engine, a Brayton cycle engine and a Rankine cycle engine.

8. The thermal energy transfer system of claim 3 wherein the heat source interface or heat source is selected from the group consisting of a subsurface of the outer surface of the containment vessel, a combustion engine exhaust, an industrial process or other waste heat stream, a manifold, a pipe, a plate, a finned structure, a dish concentrator, a trough concentrator, a heliostat, a reflector, a thermal energy storage unit, and a reactor.

9. The thermal energy transfer system of claim 1 wherein the first phase change material comprises a first material selected from the group consisting of a eutectic composition material; a substantially pure composition material, NaF/NaCl, $MgCl_2$, $NaF/CaF_2/MgF_2$, $KF/NaF/MgF_2$, KF/NaF, $KF/BeF_2$, $BeF_2$, $NaF/MgF_2$, $LiF/MgF_2$, $Li_2CO_3$, LiH, $LiF/NaF/MgF_2$, LiF, $NaCl/NiCl_2$, LiOH/LiF, LiF/LiCl, NaCl, KCl/NaCl, $Na_2B_4O_7$. $NaF/MgF_2/Kf$, NaF, $BeF_2$, LiCl/KCl, and wherein the second phase change material comprises a material selected from the group consisting of a eutectic material, a substantially pure composition material, Na, K, NaK, Li, Rb, Cs, S, Hg, Mg.

10. The thermal energy transfer system of claim 1 wherein when the containment vessel is heated, the first phase change material changes phase from a solid to a liquid and the second phase change material changes phase from a liquid to a vapor.

11. The thermal energy transfer system of claim 1, wherein the elongate thermal conductivity element is a thermosiphon.

12. An electric power generating system comprising:
a power conversion unit comprising a thermal energy conversion system and a heat receiver in thermal communication with the thermal energy conversion system;
a containment vessel defining a cavity comprising an inner surface and an outer surface, the inner surface comprising a first surface and a second surface;
a first phase change material having a first liquid density, the first phase change material disposed in the cavity;
a second phase change material having a second liquid density, the second phase change material disposed in the cavity and adjacent to and in contact with the first phase change material, wherein the second liquid density is less than the first liquid density, and the second phase change material in thermal communication with the heat receiver;
a vapor space adjacent to and defined by the first surface and the second phase change material, wherein the heat receiver is disposed in the vapor space;
an elongate thermal conductivity element having a first end and a second end, the elongate thermal conductivity element disposed in the cavity,
wherein the first end is above the second surface and the second end extends from the second surface; and
a heat source interface in thermal communication with the first phase change material, wherein the containment vessel is hermetically sealed and maintains a vacuum in the vapor space.

13. The electric power generating system of claim 12 wherein the heat receiver is oriented within the containment vessel such that a vapor phase of the second phase change material condenses thereon.

14. The electric power generating system of claim 12 wherein the first phase change material has a liquid density that is less than its solid density.

15. The electric power generating system of claim 12 wherein the heat source or heat source interface is selected from the group consisting of a subsurface of the outer surface of the containment vessel, a combustion engine exhaust, an industrial process or other waste heat stream, a manifold, waste heat, a pipe, a plate, a finned structure, a dish concentrator, a trough concentrator, a heliostat, a reflector, a thermal energy storage unit, and a reactor.

16. The electric power generating system of claim 12 wherein the first phase change material comprises a eutectic composition material; a substantially pure composition material, NaF/NaCl, MgCl$_2$, NaF/CaF$_2$/MgF$_2$, KF/NaF/MgF$_2$, KF/NaF, KF/BeF$_2$, BeF$_2$, NaF/MgF$_2$, LiF/MgF$_2$, Li$_2$CO$_3$, LiH, LiF/NaF/MgF$_2$, LiF, NaCl/NiCl$_2$, LiOH/LiF, LiOH, LiF/LiCl, NaCl, KCl/NaCl, Na$_2$B$_4$O$_7$. NaF/MgF$_2$/Kf, NaF, BeF$_2$, LiCl/KCl, and wherein the second phase change material comprises a material selected from the group consisting of a eutectic material, a substantially pure composition material, Na, K, NaK, Li, Rb, Cs, S, Hg, Mg.

17. The electric power generating system of claim 12 further comprising a solar concentrator positioned to direct solar energy upon the heat source interface, wherein the heat source interface is a portion of the outer surface of the containment vessel.

18. The electric power generating system of claim 12 wherein the heat source interface is a manifold having a first port and a second port, wherein the manifold displaces a volume of the first phase change material and the first and second ports are disposed in the outer surface of the containment vessel.

19. The electric power generating system of claim 12, wherein the elongate thermal conductivity element is a thermosiphon.

20. A method of transferring thermal energy between a heat source and a power conversion unit having a heat receiver, the method comprising the steps of:
transferring thermal energy from the heat source to a first phase change material disposed in a hermetically sealed containment vessel having a first inner surface and a second inner surface;
transferring thermal energy to a second phase change material in the containment vessel using the first phase change material;
vaporizing the second phase change material in a portion of the containment vessel at least partially defined by the first inner surface;
transferring heat along an elongate thermal conductivity element disposed in the containment vessel and extending from the second inner surface, the elongate thermal conductivity element at least partially surrounded by the first phase change material; and
condensing the second phase change material on a heat receiver disposed in the containment vessel above the first phase change material such that thermal energy is transferred to the heat receiver.

21. The method of claim 20 wherein the temperature of the heat receiver is substantially uniform as a result of the heat transfer from the second phase change material.

22. The method of claim 20 further comprising the step of solidifying the first phase change material after transferring thermal energy to the first phase change material.

23. The method of claim 20 wherein the first phase change material comprises a eutectic composition material; a substantially pure composition material, NaF/NaCl, MgCl$_2$, NaF/CaF$_2$/MgF$_2$, KF/NaF/MgF$_2$, KF/NaF, KF/BeF$_2$, BeF$_2$, NaF/MgF$_2$, LiF/MgF$_2$, Li$_2$CO$_3$, LiH, LiF/NaF/MgF$_2$, LiF, NaCl/NiCl$_2$, LiOH/LiF, LiOH, LiF/LiCl, NaCl, KCl/NaCl, Na$_2$B$_4$O$_7$. NaF/MgF$_2$/Kf, NaF, BeF$_2$, LiCl/KCl, and wherein the second phase change material comprises a material selected from the group consisting of a eutectic material, a substantially pure composition material, Na, K, NaK, Li, Rb, Cs, S, Hg, Mg.

24. The method of claim 20 further comprising the step of storing thermal energy in the first phase change material sufficient for powering the power conversion unit.

25. The method of claim 20, wherein the elongate thermal conductivity element is a thermosiphon.

26. A thermal energy storage system comprising:
a containment vessel defining a cavity comprising an inner surface and an outer surface, the inner surface comprising a first surface and a second surface;
a thermal energy storage medium comprising,
a thermal energy storage material having a first liquid density disposed in the cavity;
a phase change material having a second liquid density, the phase change material disposed in the cavity and adjacent to and in contact with the thermal energy storage material, wherein the second liquid density is less than the first liquid density;
a vapor space adjacent to and defined by the first surface and the second phase change material;
a heat receiver of a power conversion unit, the heat receiver disposed in the vapor space and extending through the first surface;
an elongate thermal conductivity element disposed in the cavity, the elongate thermal conductivity element having a first end and a second end,
wherein the first end is above the second surface and the second end extends from the second surface; and
a solar energy receiving surface in thermal communication with the second surface, wherein the containment vessel is hermetically sealed.

27. The thermal energy storage system of claim 26 further comprising a support structure configured to elevate the solar energy receiving surface above ground level and wherein the energy storage medium stores sufficient thermal energy to power the power conversion unit from about 1 hour to about 24 hours.

28. The thermal energy storage system of claim 26 wherein the thermal energy storage material comprises a eutectic composition material; a substantially pure composition material, NaF/NaCl, MgCl$_2$, NaF/CaF$_2$/MgF$_2$, KF/NaF/MgF$_2$, KF/NaF, KF/BeF$_2$, BeF$_2$, NaF/MgF$_2$, LiF/MgF$_2$, Li$_2$CO$_3$, LiH, LiF/NaF/MgF$_2$, LiF, NaCl/NiCl$_2$, LiOH/LiF, LiOH, LiF/LiCl, NaCl, KCl/NaCl, Na$_2$B$_4$O$_7$. NaF/MgF$_2$/Kf, NaF, BeF$_2$, LiCl/KCl, and wherein the phase change material comprises a material selected from the group consisting of a eutectic material, a substantially pure composition material, Na, K, NaK, Li, Rb, Cs, S, Hg, Mg.

29. The thermal energy storage system of claim 26 wherein the vapor space defines a vacuum and wherein the thermal energy storage material is a salt and wherein the phase change material is a metal.

30. The thermal energy storage system of claim 26 wherein the thermal energy storage material has a liquid density that is less than its solid density.

* * * * *